(12) United States Patent
Fujishima et al.

(10) Patent No.: US 11,146,582 B2
(45) Date of Patent: Oct. 12, 2021

(54) INFORMATION PROCESSING APPARATUS, RECORDING MEDIUM RECORDING NETWORK MONITORING PROGRAM, AND NETWORK MONITORING METHOD

(71) Applicant: FUJITSU LIMITED, Kawasaki (JP)

(72) Inventors: Yuki Fujishima, Yokohama (JP); Masanobu Morinaga, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 16/662,337

(22) Filed: Oct. 24, 2019

(65) Prior Publication Data

US 2020/0059486 A1 Feb. 20, 2020

Related U.S. Application Data

(63) Continuation of application No. PCT/JP2018/004183, filed on Feb. 7, 2018.

(30) Foreign Application Priority Data

Apr. 27, 2017 (JP) .............................. JP2017-087872

(51) Int. Cl.
*H04L 29/06* (2006.01)
*H04L 12/26* (2006.01)

(52) U.S. Cl.
CPC .......... *H04L 63/1425* (2013.01); *H04L 43/18* (2013.01)

(58) Field of Classification Search
CPC . H04L 63/1425; H04L 43/18; H04L 43/0894; H04L 45/00; H04L 47/365; G06F 21/554; G06F 11/3438; G06F 21/31; G06F 21/552; G06F 2221/034; G06F 2221/2103
See application file for complete search history.

(56) References Cited

U.S. PATENT DOCUMENTS

| | | | | |
|---|---|---|---|---|
| 7,127,510 B2* | 10/2006 | Yoda | ...................... | H04L 43/00 709/225 |
| 7,382,787 B1* | 6/2008 | Barnes | .................... | H04L 69/22 370/401 |
| 8,270,401 B1* | 9/2012 | Barnes | .................... | H04L 12/66 370/389 |
| 9,531,615 B2* | 12/2016 | Oshiba | .................. | H04L 47/365 |

(Continued)

FOREIGN PATENT DOCUMENTS

| | | |
|---|---|---|
| JP | 2003-264609 | 9/2003 |
| JP | 2015-170878 | 9/2015 |

(Continued)

OTHER PUBLICATIONS

ISR—International Search Report (Forms PCT/ISA/210, 220, 237) dated Apr. 24, 2018 for International Patent Application No. PCT/JP2018/004183.

*Primary Examiner* — Hosuk Song
(74) *Attorney, Agent, or Firm* — Fujitsu Patent Center

(57) ABSTRACT

An information processing apparatus includes: a memory; and a processor coupled to the memory and configured to: specify, from among packets which are captured in a network, a head packet for transmitting a response related to remote control; extract a total size of the response from the head packet; calculate an area size which is assigned for the response in the head packet; and determine, based on the total size and the area size, that the remote control succeeds.

9 Claims, 24 Drawing Sheets

(56) References Cited

U.S. PATENT DOCUMENTS

2016/0127247 A1\* 5/2016 Anzai .................... H04L 47/10
　　　　　　　　　　　　　　　　　　　　　　370/230
2017/0078312 A1　　3/2017　Yamada et al.

FOREIGN PATENT DOCUMENTS

| JP | 2017-059964 | 3/2017 |
| WO | 2010/082289 A1 | 7/2010 |

\* cited by examiner

FIG. 12

OPERATION LOG

| DATE AND TIME | SOURCE IP ADDRESS | SOURCE PORT NUMBER | DESTINATION IP ADDRESS | DESTINATION PORT NUMBER | COMMAND AND OPTION | ATTRIBUTE DATA | DETERMINATION RESULT |
|---|---|---|---|---|---|---|---|
| ... | ... | ... | ... | ... | ... | ... | ... |
| $T_4$ | x.x.x.1 | $P_7$ | x.x.x.4 | $P_8$ | LOG ACQUISITION | LOG DATA, ACCOUNT NAME= userA | SUCCESS |

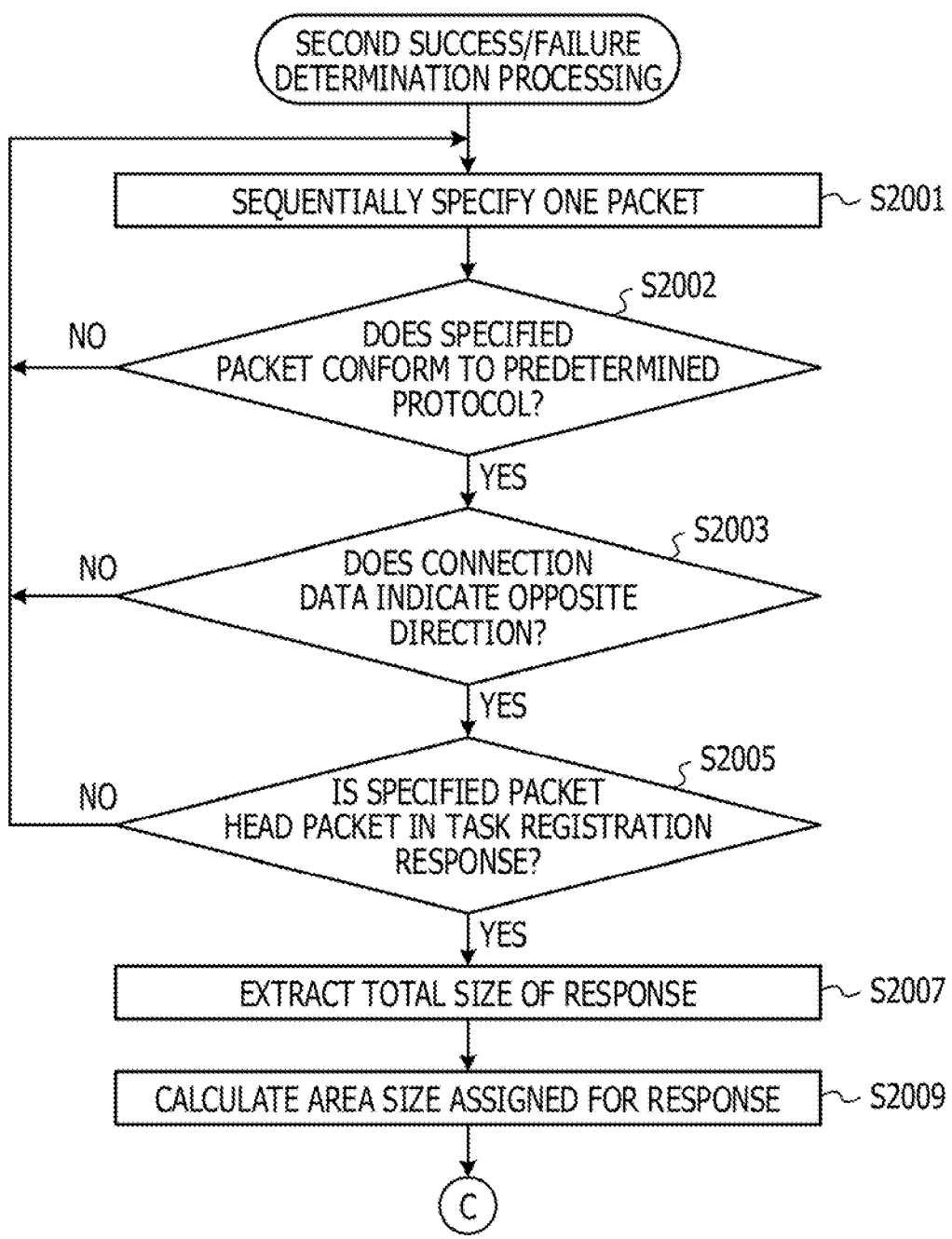

INFORMATION PROCESSING APPARATUS, RECORDING MEDIUM RECORDING NETWORK MONITORING PROGRAM, AND NETWORK MONITORING METHOD

CROSS-REFERENCE TO RELATED APPLICATION

This application is a continuation application of International Application PCT/JP2018/004183 filed on Feb. 7, 2018 and designated the U.S., the entire contents of which are incorporated herein by reference. The International Application PCT/JP2018/004183 is based upon and claims the benefit of priority of the prior Japanese Patent Application No. 2017-087872, filed on Apr. 27, 2017, the entire contents of which are incorporated herein by reference.

FIELD

The embodiment discussed herein is related to a technique for monitoring a network.

BACKGROUND

As a form of a cyber attack, a computer infected with malware may remotely control a target computer. For example, in a case where an attacker somehow steals a legitimate account, the legitimate account will be used to remotely control the target computer.

Japanese Laid-open Patent Publication No. 2003-264609 is disclosed as related art.

SUMMARY

According to an aspect of the embodiments, an information processing apparatus includes: a memory; and a processor coupled to the memory and configured to: specify, from among packets which are captured in a network, a head packet for transmitting a response related to remote control; extract a total size of the response from the head packet; calculate an area size which is assigned for the response in the head packet; and determine, based on the total size and the area size, that the remote control succeeds.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of an operation log for log acquisition;

FIG. 20A illustrates a second success/failure determination processing flow;

DESCRIPTION OF EMBODIMENTS

In a case where a maintenance person finds the infected computer, the maintenance person pays attention to success or failure of remote control from the infected computer. This is because, if the remote control is part of an attack, damage may be expanded. In particular, for example, in a case where the infected computer is remotely controlling the target computer, it is desirable to quickly cope with the remote control.

Therefore, in a case where it is suspected that an infected computer has attempted to remotely control a target computer, it is desirable to be able to quickly determine that the remote control has succeeded.

In one aspect, quicker determination of success of remote control in a network may be enabled.

Figure 1:
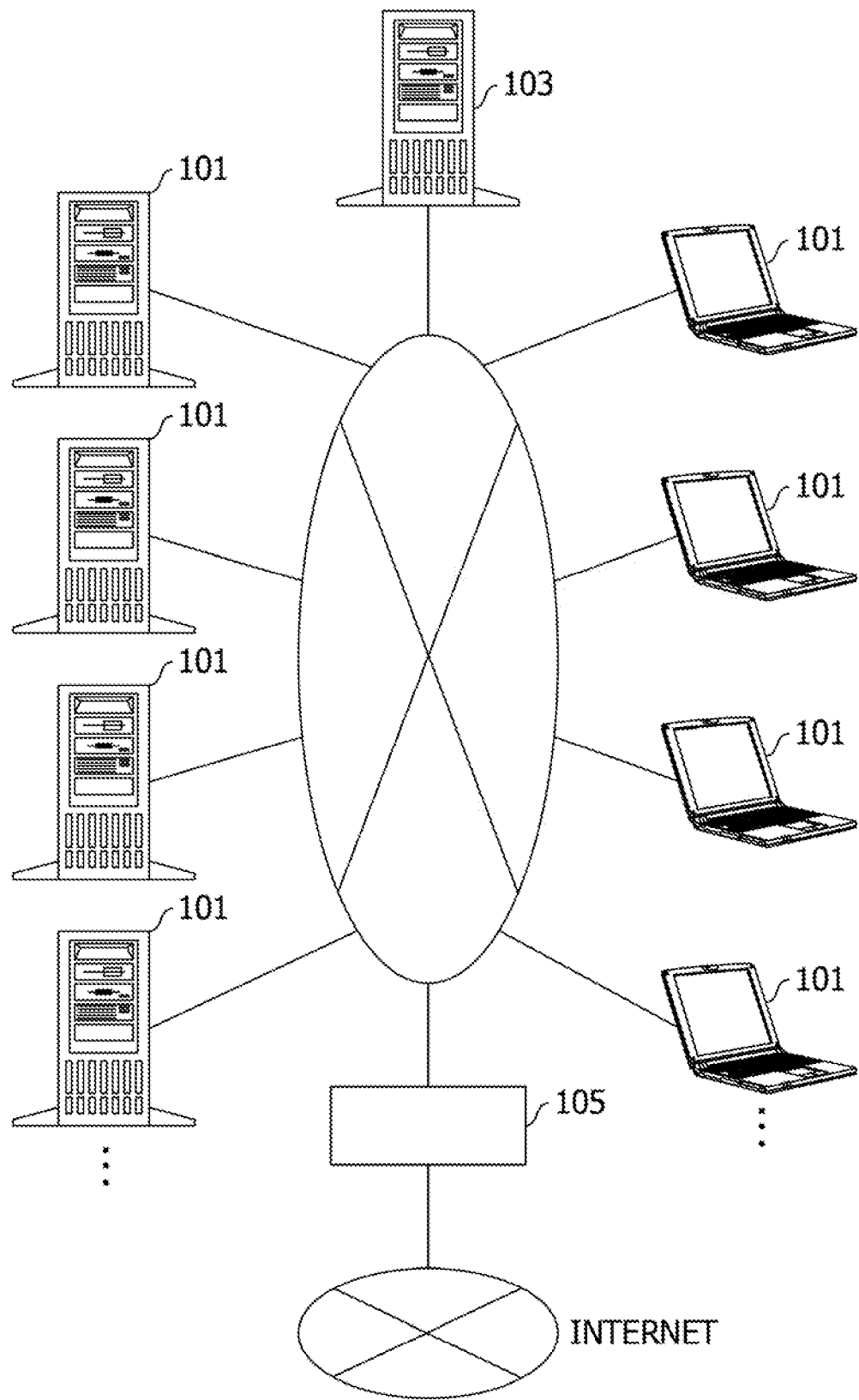
FIG. 1 illustrates an example of an information processing system.

FIG. 1 illustrates an example of an information processing system. A plurality of computers 101 is connected via a network (for example, a local area network (LAN)). The network is connected to the Internet via a firewall 105. It is assumed that the information processing system is based on, for example, an intranet. Each of the computers 101 is, for example, a server device or a client terminal. A function of the server device is optional. The server device may be, for example, a domain management server, a web server, a file server, a Windows (registered trademark) server, or a Samba server.

Each client terminal may use a service provided by each server device. Each client terminal may use data held by each server device. A plurality of the server devices may cooperate with one another. The client terminals may share data with each other. One client terminal may use a service provided by another client terminal.

That is, for example, it is assumed that the computers 101 may optionally perform remote control under a predetermined condition. Thus, control based on a server message block (SMB) and/or remote procedure calls (RPC) is performed among the plurality of computers 101. Each of the SMB and the RPC is an example of a protocol of an application layer, which provides a remote control function.

Malware is, for example, a remote administration tool (RAT) that performs a targeted attack. The malware is sent to the computer 101 in the information processing system via a targeted e-mail, an illegal site, or the like. The malware sent to the computer 101 performs, for example, the following illegal operation under an instruction from an attacker outside the information processing system. The computer 101 thus intruded by the malware is referred to as an infected computer.

The malware performs, from the infected computer, an OS scan or a service scan of the surrounding computers 101, collects information regarding an internal state of the information processing system, and transfers the information to the attacker. The attacker selects one of the surrounding computers 101 as an attack target. The computer 101 thus selected as the attack target is referred to as a target computer.

Under an instruction from the attacker, the malware illegally operates the target computer and prepares an environment for stealing internal information. At this time, for example, remote control such as account registration, file write, task registration, service registration, or service activation is performed on the target computer from an attacking computer.

In addition, under an instruction from the attacker, the malware reads the internal information from the target computer. The internal information is then transferred to the external attacker directly or indirectly from the attacking computer, for example.

The malware may also send its own copy to another computer 101. That is, for example, the malware may self-propagate in the information processing system. When such illegal remote control is repeated, a range of damage expands in a chained manner. In addition, a risk of data leakage or data tampering increases.

At a stage of ending the attack, the malware erases traces of its own attack, under an instruction from the attacker. Thus, the malware performs, on the target computer, remote control such as account deletion, file deletion, task deletion, service stop, service deletion, or log deletion. The malware also performs similar control on the infected computer.

In the present embodiment, data related to the attack is extracted from various types of transmission data, and success or failure of the attack is determined. In an initial stage of finding malware, a known technique is used. For example, there is a technique for detecting an operation in which malware reads internal information from a target computer or an operation in which malware communicates with the outside of the information processing system.

When detecting an infected computer, a network monitoring apparatus 103 specifies illegal remote control performed by the infected computer. The network monitoring apparatus 103 then determines success or failure of the illegal remote control performed by the infected computer. The network monitoring apparatus 103 is connected to the network via, for example, a switch or network tap compatible with port mirroring.

Figure 2:
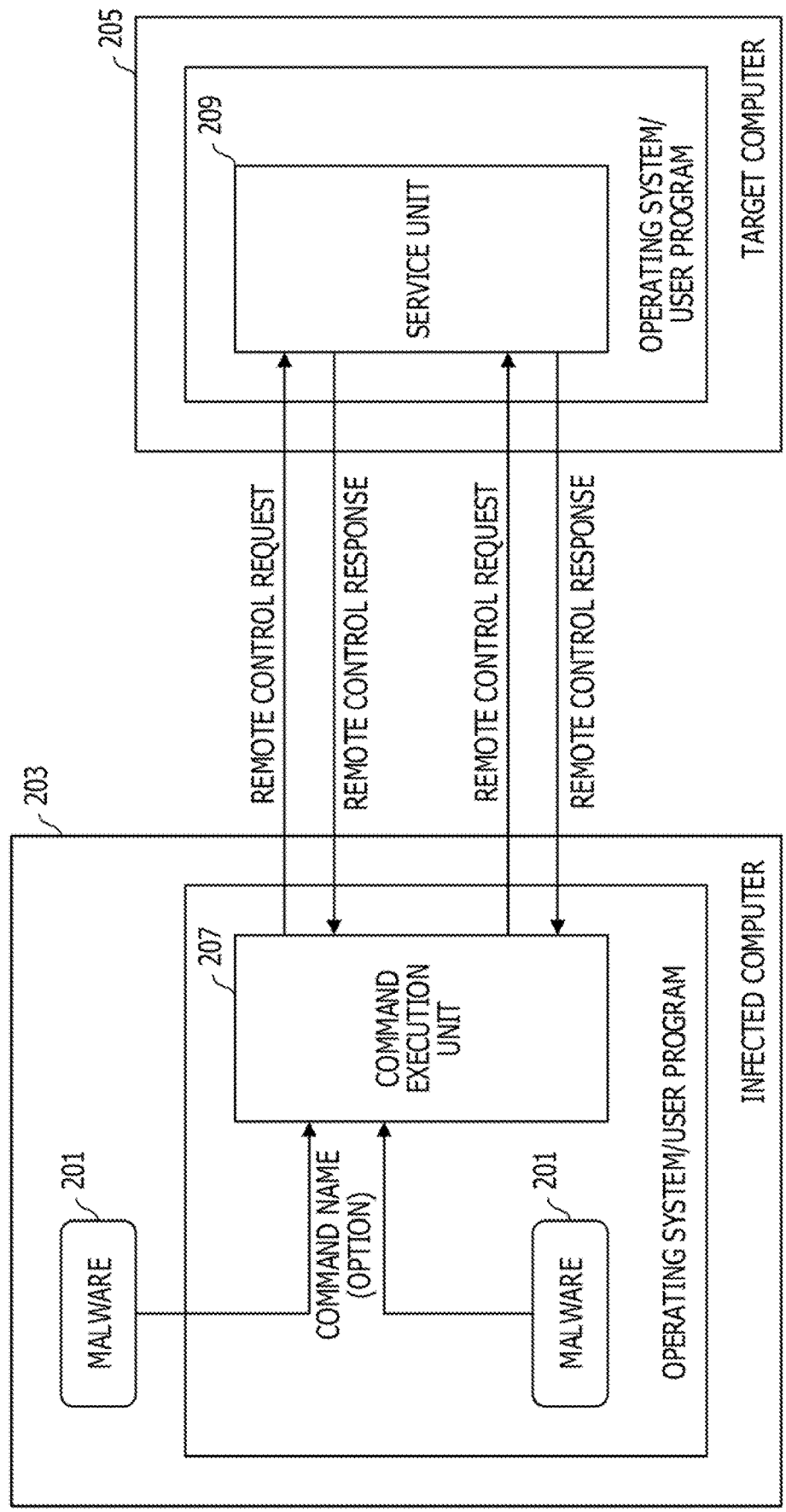
FIG. 2 illustrates an outline of remote control by malware.

An outline of remote control by malware 201 will be described with reference to FIG. 2. For example, the malware 201 may exist as an independent program hidden in user programs. In a case where the number of unknown processes is increased compared to a normal state, there is a possibility that such malware 201 is activated as a process.

The malware 201 may also be injected into an operating system. In such a case, for example, a program invoking library routines such as a dynamic link library (DLL) is added, but the number of unknown processes is not increased. Similarly, the malware 201 may be injected into a legitimate user program. Thus, there is a concern that the malware 201 is missed only by monitoring the processes.

The malware 201 attempts illegal remote control using a command execution unit 207 in an infected computer 203. That is, for example, the malware 201 issues a command to the command execution unit 207 in a state of being hidden in a legitimate route, and indirectly controls a service unit 209 of a target computer 205. Alternatively, the malware 201 itself may have a function corresponding to the command execution unit 207. In this case, the malware 201 directly exchanges a packet similar to that in the case of using the command execution unit 207 with the service unit 209 of the target computer 205, and performs processing corresponding to a predetermined command.

Here, operations of the command execution unit 207 and the service unit 209, which are technical premises, will be described. Each of the command execution unit 207 and the service unit 209 similarly operates regardless of whether the computer 101 is infected with the malware 201 or the computer 101 is not infected with the malware 201.

The command execution unit 207 sends a remote control request to the service unit 209. The service unit 209 provides a service in response to the remote control request.

In many cases, the computer 101 includes various command execution units 207 and service units 209. The service unit 209 provides, for example, a service that controls various services. In addition, there are a service unit 209 that provides a file access service, a service unit 209 that provides a network sharing service, a service unit 209 that provides a register operation service, and the like.

The service unit 209 may be provided in a user program instead of being provided in the operating system. Similarly, the command execution unit 207 may be provided in a user program instead of being provided in the operating system.

Normally, for example, the command execution unit 207 executes a command by being called from a module inside or outside the operating system or the user program, or by being called via a graphical user interface (GUI). Specifically, for example, the command execution unit 207 accepts a command name or a combination of a command name and an option.

In the present embodiment, it is assumed that the command execution unit 207 exchanges a packet related to a remote control request and a packet related to a remote control response with the service unit 209, based on the SMB and/or the RPC. The exchange of the packets to execute one command may be performed once or a plurality of times.

In a case where the malware 201 has intruded into the operating system or the user program, the malware 201 internally calls the command execution unit 207. In a case where the malware 201 exists outside the operating system or the user program, the malware 201 calls the command execution unit 207 from the outside. Also in the case where the malware 201 itself performs an operation corresponding to the command execution unit 207, the infected computer 203 performs processing corresponding to execution of the command according to an SMB and/or RPC protocol.

Figure 3:
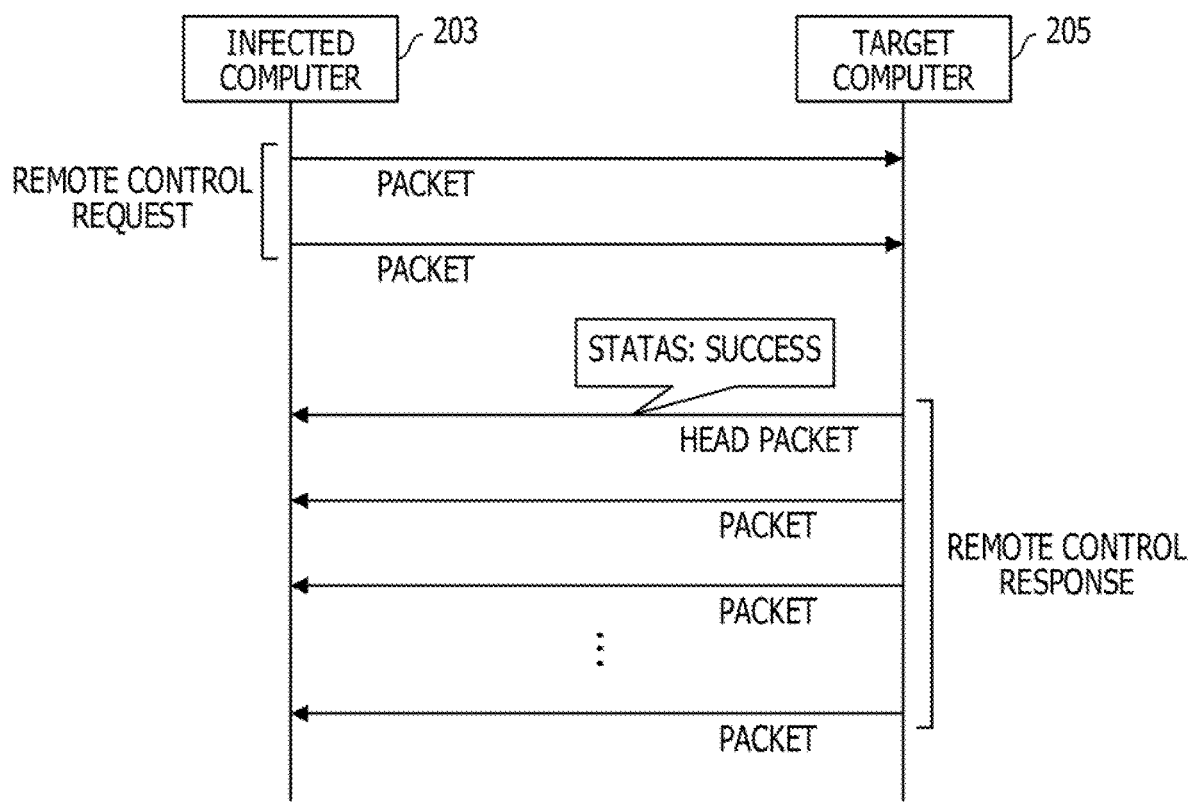
FIG. 3 illustrates a sequence at the time of success in a first type of the remote control.

Two types of remote control status replies will be described. FIG. 3 illustrates a sequence at the time of success in a first type of the remote control. A remote control request is transmitted in one or more packets. In this example, a remote control request is transmitted in two packets.

When accepting the remote control request from the infected computer 203, the target computer 205 executes a remote control service. The target computer 205 then sends a remote control response to the infected computer 203. In a case where processing related to the remote control has succeeded, the remote control response is transmitted in a plurality of packets. In a case where the response is large data in the remote control, the response is divided into a plurality of packets because a frame length is limited.

In the first type, a status indicating a processing result of the remote control is set in a head packet. Accordingly, the network monitoring apparatus 103 obtains the processing result of the remote control by extracting the status from the captured head packet. Therefore, it is not necessary to check second and subsequent packets.

Figure 4:
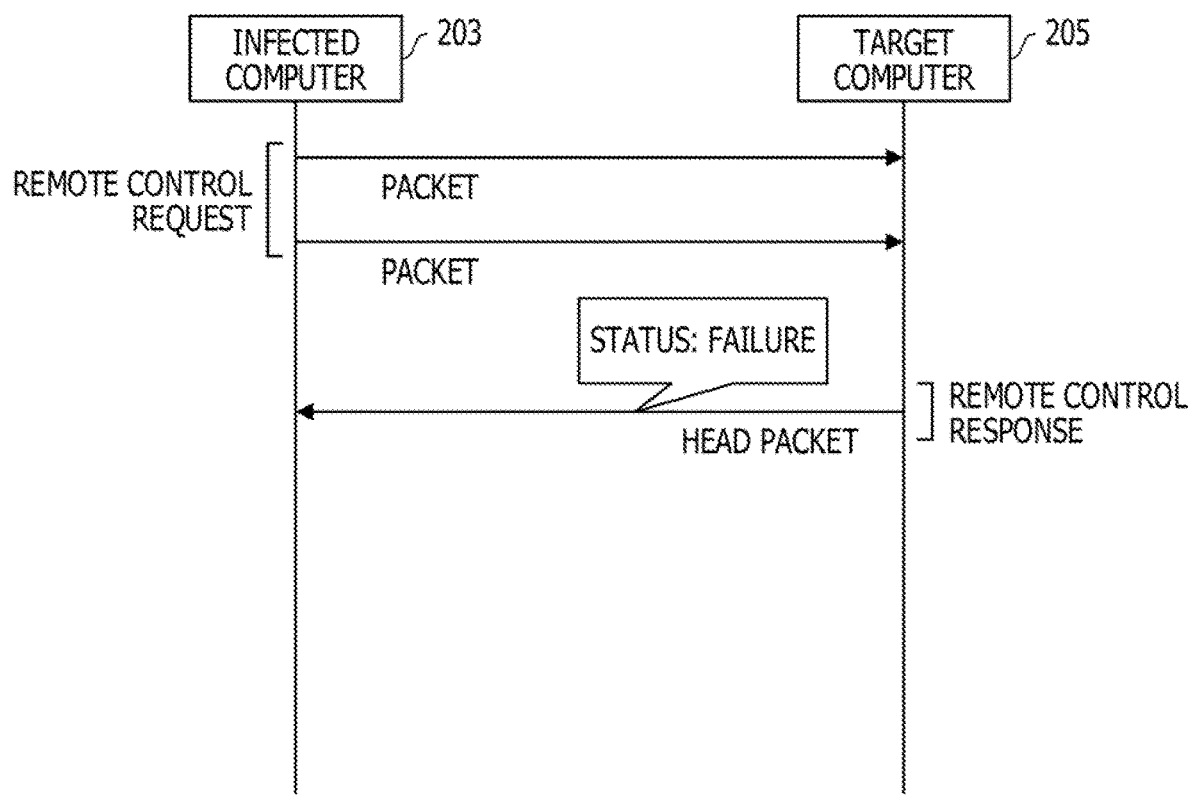
FIG. 4 illustrates a sequence at the time of failure in the first type of the remote control.

FIG. 4 illustrates a sequence at the time of failure in the first type of the remote control. In a case where processing related to the remote control has failed, a remote control response is transmitted in one packet. A status indicating that the processing related to the remote control has failed is set in the packet. Also in this case, the network monitoring apparatus 103 obtains a processing result of the remote control by extracting the status from a captured head packet.

Figure 5:
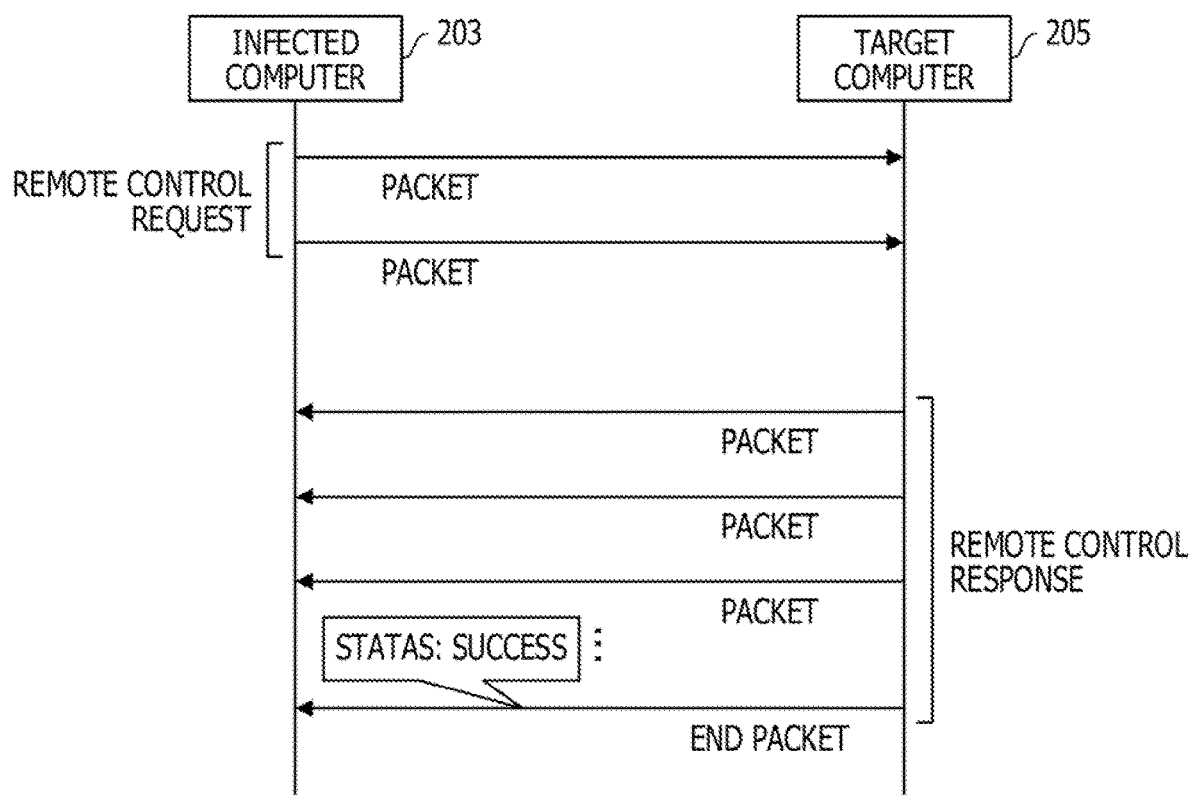
FIG. 5 illustrates a sequence at the e of success in a second type of the remote control.

Next, a second type of the remote control status replies will be described. FIG. 5 illustrates a sequence at the time of success in the second type of the remote control. As in the case of the first type, a remote control request is transmitted in one or more packets. In this example, a remote control request is transmitted in two packets.

When accepting the remote control request from the infected computer 203, the target computer 205 executes a remote control service. The target computer 205 then sends a remote control response to the infected computer 203. Also in the case of the second type, when processing related to the remote control has succeeded, the remote control response is transmitted in a plurality of packets.

In the second type, a status indicating a processing result of the remote control is set in an end packet. Accordingly, the network monitoring apparatus 103 stands by until the end packet is captured, and extracts the status from the end packet, thereby obtaining the processing result of the remote control. Therefore, a standby time is longer than in the case of the first type.

Figure 6:
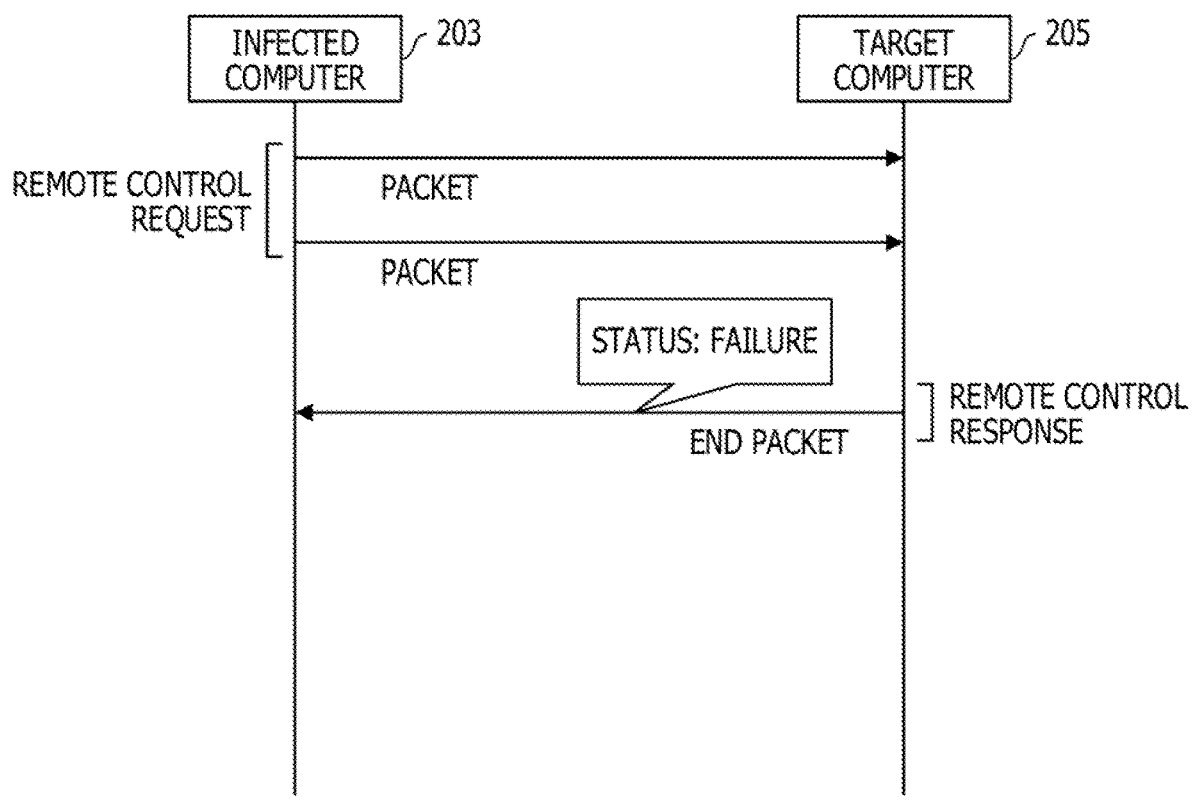
FIG. 6 illustrates a sequence at the time of failure in the second type of the remote control.

FIG. 6 illustrates a sequence at the time of failure in the second type of the remote control. Also in the case of the second type, when processing related to the remote control has failed, a remote control response is transmitted in one packet. Since the packet corresponds to an end packet, a status indicating that the processing related to the remote control has failed is set in the packet. The network monitoring apparatus 103 obtains a processing result of the remote control by extracting the status from the one packet which is the captured remote control response.

Figure 7:
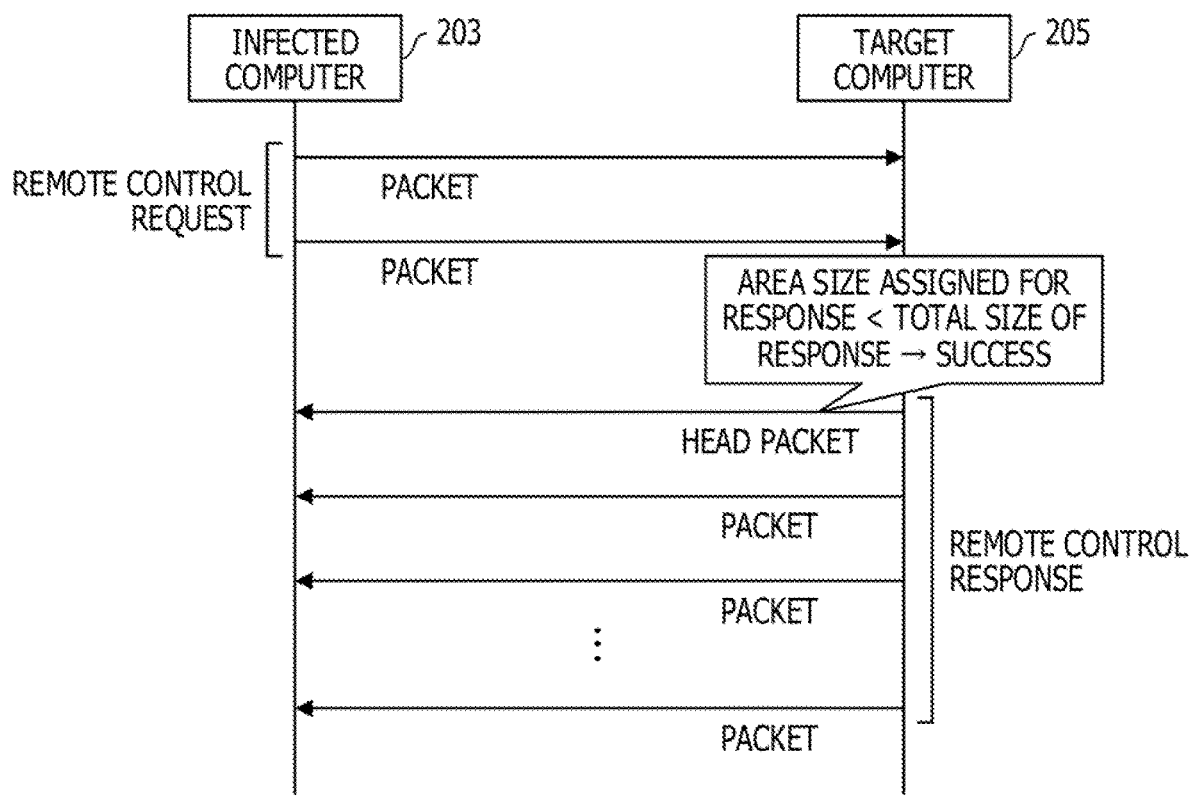
FIG. 7 illustrates an outline of success determination in the present embodiment.

In the present embodiment, a result of the second type of the remote control may be determined more quickly. FIG. 7 illustrates an outline of success determination in the present embodiment. This example assumes the second type of the remote control. In a case where a remote control response is divided into a plurality of packets, the control is regarded as having succeeded. It is assumed that a certain amount of data is transmitted by the remote control.

Specifically, for example, the network monitoring apparatus 103 extracts a total size of the remote control response from a head packet related to the response. In addition, the network monitoring apparatus 103 calculates an area size assigned for the remote control response in the head packet. In a case where the area size assigned for the response is less than the total size of the response, it is determined that a processing result of the remote control is success.

Figure 8:
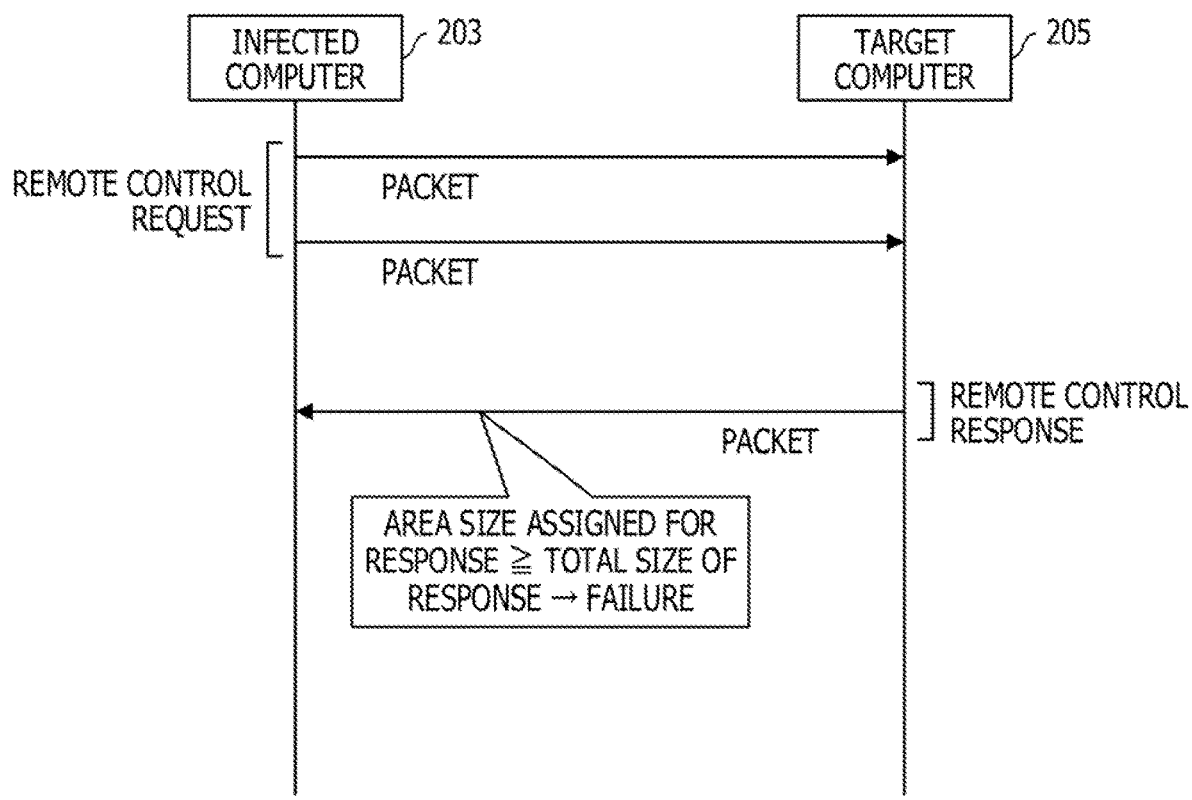
FIG. 8 illustrates an outline of failure determination in a first method of the present embodiment.

In the present embodiment, two methods are adopted for failure determination. FIG. 8 illustrates an outline of failure determination in a first method of the present embodiment. In the first method of the present embodiment, in a case where a remote control response is not divided into a plurality of packets, the control is regarded as having failed. It is assumed that large data is not transmitted in the case where the remote control has failed.

Specifically, for example, the network monitoring apparatus 103 extracts a total size of the remote control response from one packet related to the response. In addition, the network monitoring apparatus 103 calculates an area size assigned for the remote control response. In a case where the area size assigned for the response is equal to or larger than the total size of the response, it is determined that a processing result of the remote control is failure. Basically, in a case where the area size is equal to the total size, the processing result of the remote control is determined to be failure.

Figure 9:
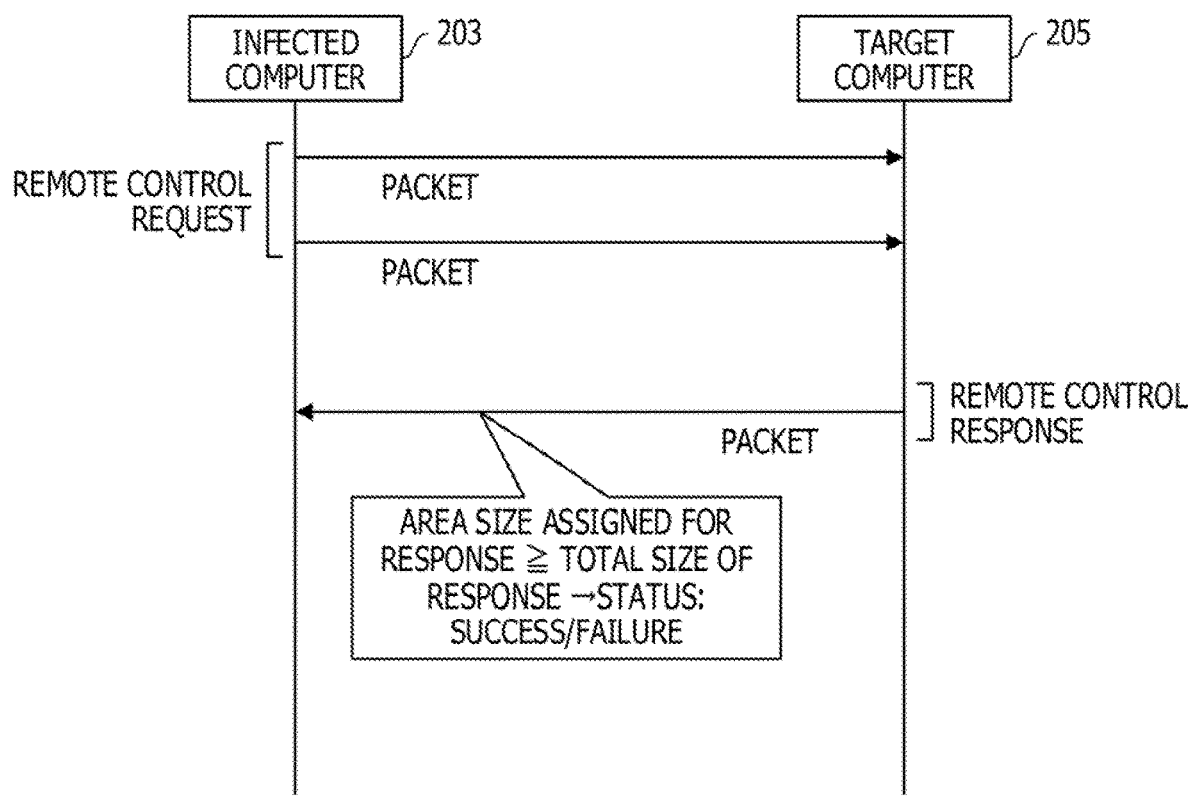
FIG. 9 illustrates an outline of failure determination in a second method of the present embodiment.

FIG. 9 illustrates an outline of failure determination in a second method of the present embodiment. In the second method, it is also assumed that a remote control response in a case where the remote control has succeeded is transmitted in one packet. Thus, in a case where the remote control response is not divided into a plurality of packets, a processing result is determined based on a status indicating the processing result.

Specifically, for example, the network monitoring apparatus 103 extracts a total size of the remote control response from one packet related to the response. In addition, the network monitoring apparatus 103 calculates an area size assigned for the remote control response. In a case where the area size assigned for the response is equal to or larger than the total size of the response, the status is extracted from the packet. In a case where the status indicates success, a determination result is success. On the other hand, in a case where the status indicates failure, a determination result is failure.

Figure 10:
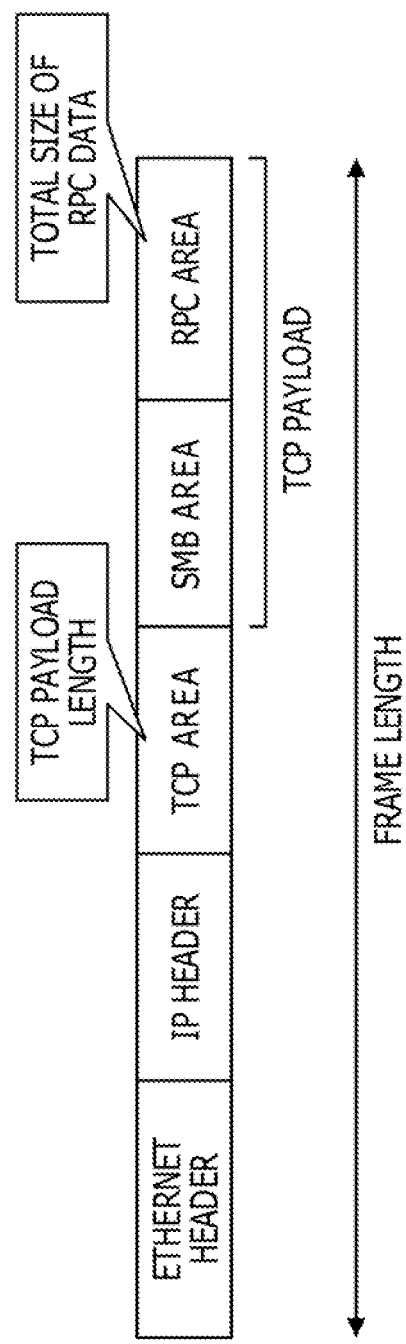
FIG. 10 illustrates a structure of a packet.

Here, a structure of a packet, which is a premise of an example described below, will be described with reference to FIG. 10. The packet includes an Ethernet header, an Internet protocol (IP) header, a transmission control protocol (TCP) area, an SMB area, and an RPC area. In the example of FIG. 10, a physical header is omitted.

The TCP area includes a TCP header. The SMB area includes an SMB header. The RPC area includes an RPC header and an RPC body. The RPC area is an example of an area assigned for a remote control response.

A TCP payload length is set in the TCP area. The TCP payload length corresponds to the sum of a size of the SMB area and a size of the RPC area. The network monitoring apparatus 103 obtains the size of the RPC area (the area size assigned for the remote control response) by subtracting a predetermined size of the SMB area from the TCP payload length.

A total size of RPC data is set in the RPC area. In a case where the RPC data is not divided into a plurality of packets, the total size of the RPC data matches the size of the RPC area. In a case where the RPC data is divided into a plurality of packets, the total size of the RPC data is larger than the size of the RPC area. Although the TCP area is provided in this example, a user datagram protocol (UDP) area may be provided instead of the TCP area.

Three examples of the remote control are given below. Log acquisition is an operation in which the command execution unit 207 acquires log data held in the service unit 209. The log acquisition corresponds to the above-described second type, and failure determination in the log acquisition is performed by the above-described first method. Task registration is an operation in which the command execution unit 207 registers a task in the service unit 209. The task registration also corresponds to the above-described second type. However, failure determination in the task registration is performed by the above-described second method. Account registration is an operation in which the command execution unit 207 registers an account in the service unit 209. The account registration corresponds to the above-described first type and is processed by a known technique.

Figure 11:
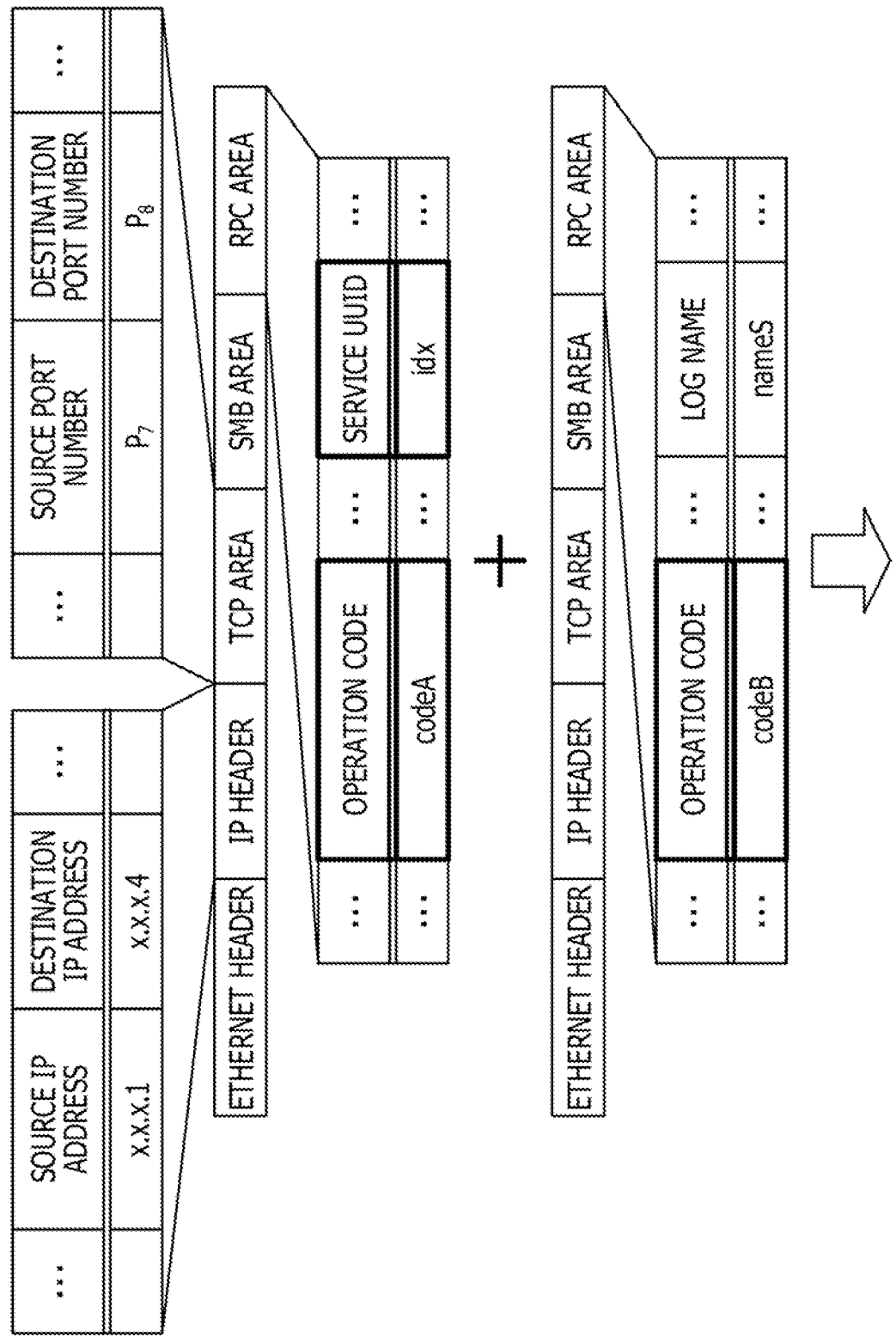
FIG. 11 illustrates an example of a packet for log acquisition.

FIG. 11 illustrates an example of a packet for log acquisition. For example, in a case where it is attempted to acquire log data in the target computer 205, the malware 201 may send a packet for log acquisition to the target computer 205.

It is assumed that a first packet in log acquisition illustrated in an upper stage of FIG. 11 is sent from a computer 101 with an IP address "x.x.x.1" to a computer 101 with an IP address "x.x.x.4". Accordingly, "x.x.x.1" is set in a field of a source IP address, and "x.x.x.4" is set in a field of a destination IP address. The same applies to a case of a second packet in log acquisition illustrated in a lower stage of FIG. 11. It is assumed that log acquisition procedure in this example conforms to a remote control protocol.

In a case where an operation code set in the first packet is codeA, a service universally unique identifier (UUID) set in the first packet is idX, and an operation code set in the second packet (in which a protocol, a source IP address, a source port number, a destination IP address, and a destination port number are common to those in the first packet) is codeB, these packets are determined to request log acquisition.

FIG. 12 illustrates an example of an operation log for log acquisition. In the operation log illustrated in FIG. 12, a new record indicating contents of the packet for log acquisition illustrated in the upper and lower stages of FIG. 11 is provided.

Date and time, a source IP address, a destination IP address, a source port number, and a destination port number are as described above.

In this example, in a field of a command and option, a command name "log acquisition" is set and an option is omitted.

In this example, attribute items in the log acquisition are log data and an account name. The account name indicates a log acquisition request source. The account name has been specified in an authentication stage. However, the attribute items in the log acquisition are not limited to this example.

A determination result indicates whether log acquisition processing in the service unit 209 has succeeded or failed.

Figure 13:
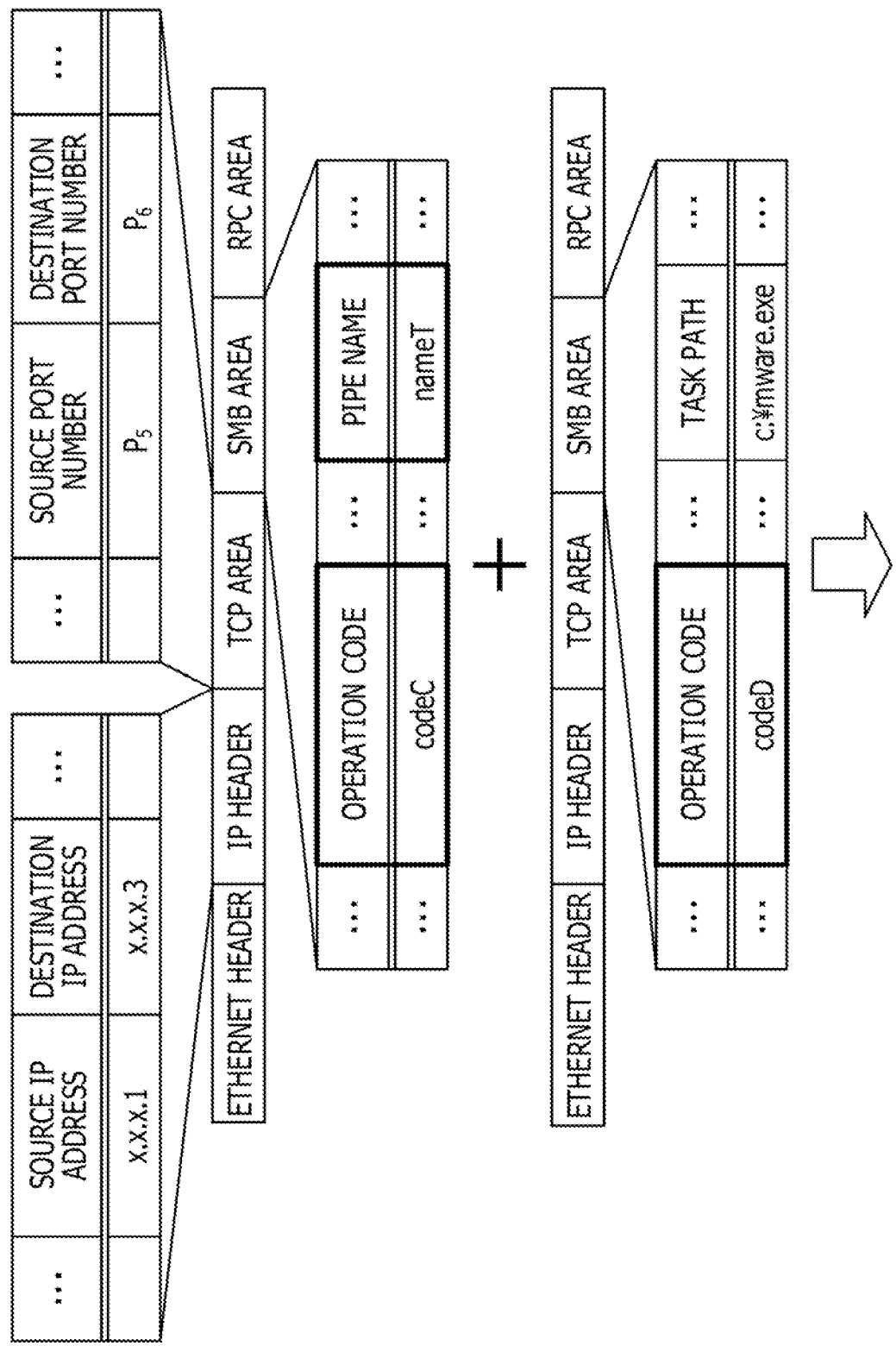
FIG. 13 illustrates an example of a packet for task registration.

FIG. 13 illustrates an example of a packet for task registration. For example, in a case where it is attempted to operate a desired task on the target computer 205, the malware 201 may send a packet for task registration to the target computer 205.

It is assumed that a first packet in task registration illustrated in an upper stage of FIG. 13 is sent from a computer 101 with an IP address "x.x.x.1" to a computer 101 with an IP address "x.x.x.3". Accordingly, "x.x.x.1" is set in a field of a source IP address, and "x.x.x.3" is set in a field of a destination IP address. The same applies to a case of a second packet in file read illustrated in a lower stage of FIG. 13. It is assumed that task registration procedure in this example conforms to a remote control protocol.

In a case where an operation code set in the first packet is codeC, a pipe name set in the same packet is nameT, and an operation code set in the second packet (in which a protocol, a source IP address, a source port number, a destination IP address, and a destination port number are common to those in the first packet) is codeD, these packets are determined to request task registration.

Figure 14:
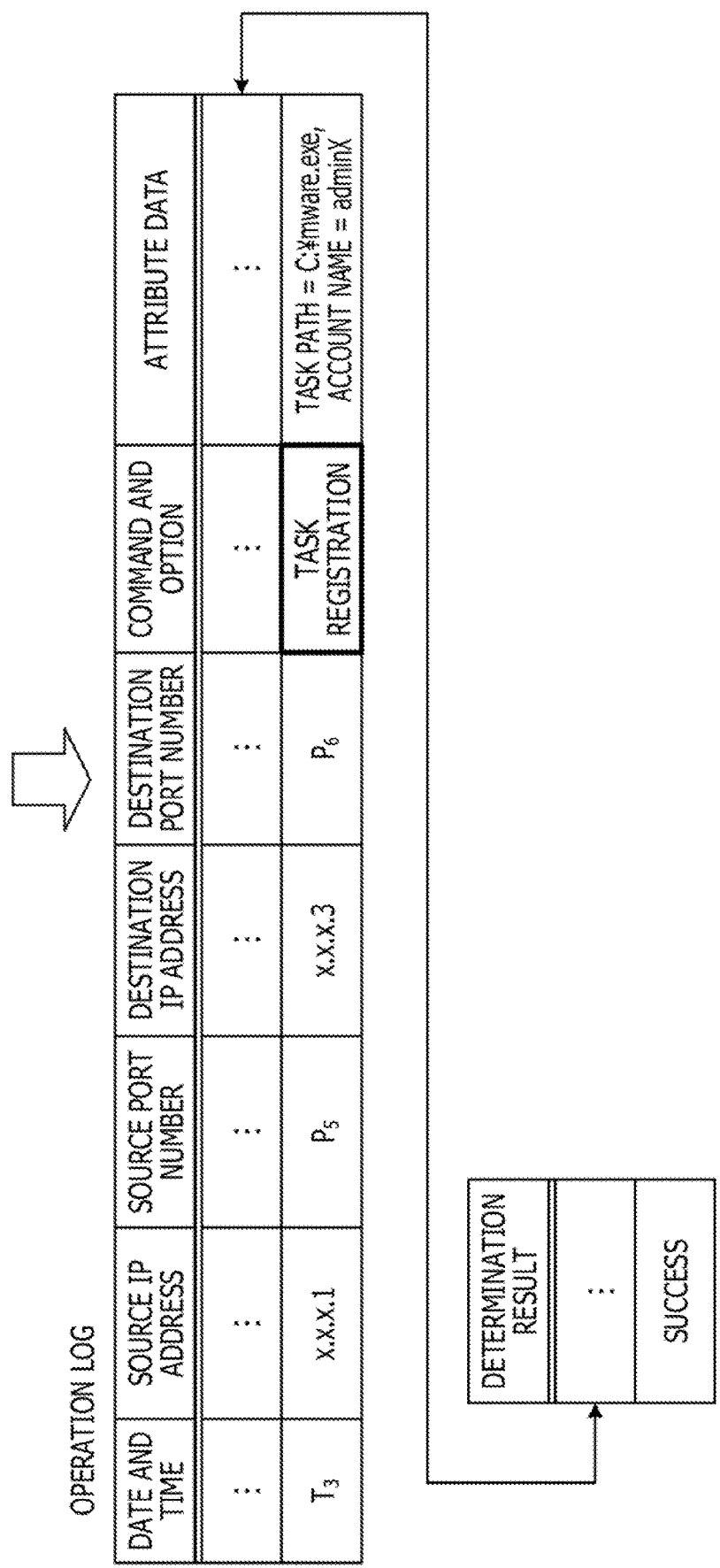
FIG. 14 illustrates an example of an operation log for task registration.

FIG. 14 illustrates an example of an operation log for task registration. In the operation log illustrated in FIG. 14, a new record indicating contents of the packet for task registration illustrated in the upper and lower stages of FIG. 13 is provided.

Date and time, a source IP address, a destination IP address, a source port number, and a destination port number are as described above.

In this example, in field of a command and option, a command name "task registration" is set and an option is omitted.

In this example, attribute items in the task registration are task path and an account name. The task path includes a storage location and a name of a file to be executed as a task. The task path is extracted from the second packet. The account name indicates a task registration request source. The account name has been specified in an authentication stage. However, the attribute items in the task registration are not limited to this example.

A determination result indicates whether task registration processing in the service unit 209 has succeeded or failed.

Also in a case of another command, attribute data set in a packet is specified according to a predetermined rule corresponding to each command. In addition, an option may also be specified in conjunction with the command according to a predetermined rule. Then, the specified command or a combination of the command and the option is set in the operation log. Further, according to a predetermined rule, the attribute data is extracted from the packet and recorded in the operation log based on the specified command or the combination of the command and the option. A packet for account registration will not be described in detail.

Figure 15A:
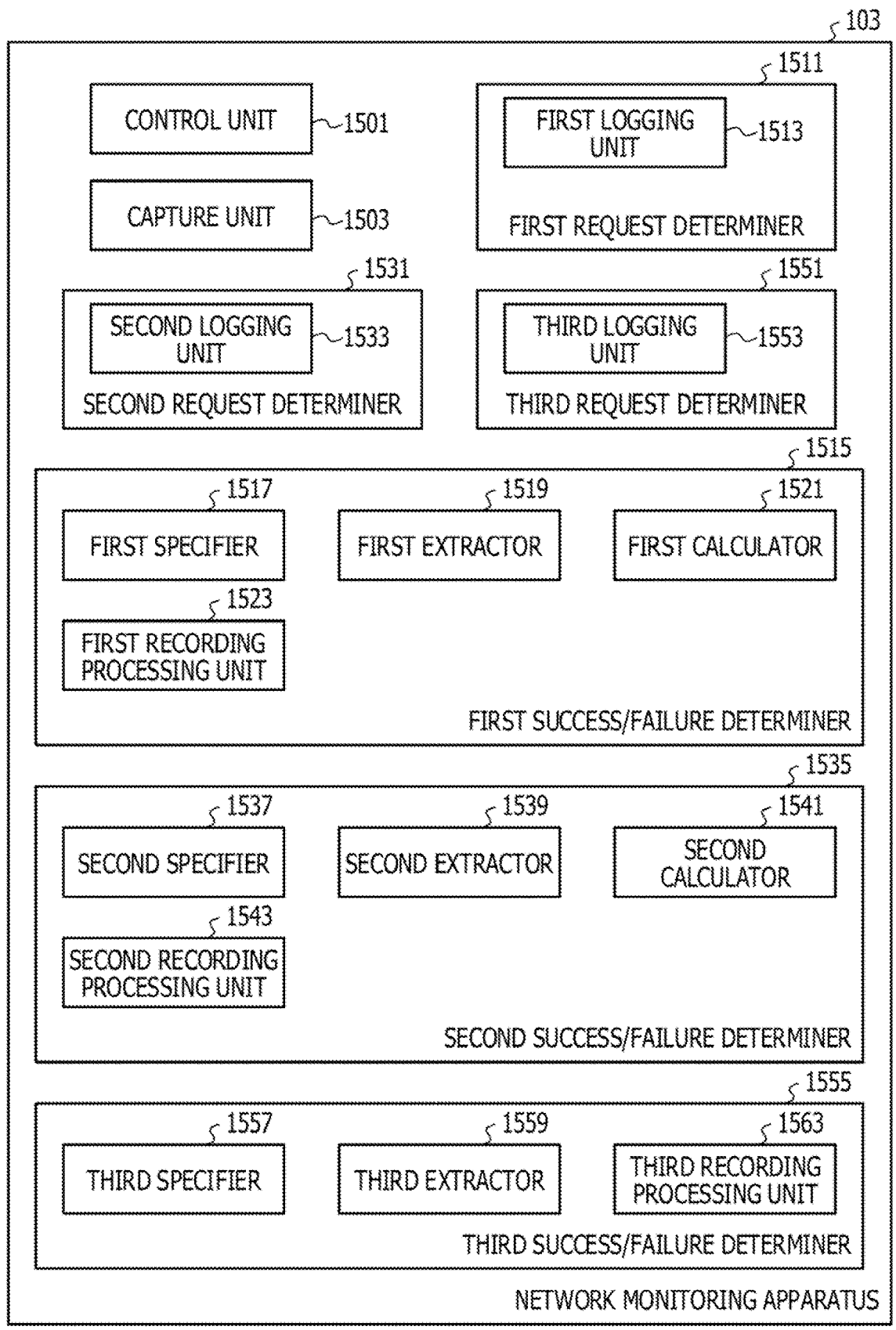
FIG. 15A illustrates an example of a module configuration of a network monitoring apparatus.
Figure 15B:
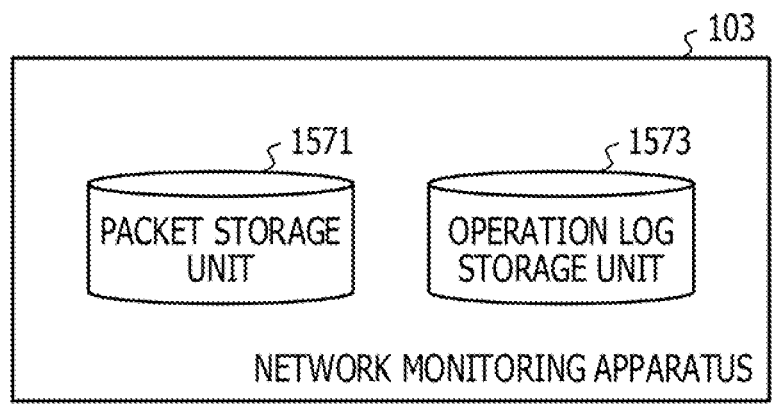
FIG. 15B illustrates an example of a module configuration of the network monitoring apparatus.

Hereinafter, an operation of the network monitoring apparatus 103 will be described. FIGS. 15A and 15B illustrate examples of a module configuration of the network monitoring apparatus 103. The network monitoring apparatus 103 includes a control unit 1501, a capture unit 1503, a first request determiner 1511, a second request determiner 1531, a third request determiner 1551, a first success/failure determiner 1515, a second success/failure determiner 1535, a third success/failure determiner 1555, a packet storage unit 1571, and an operation log storage unit 1573.

The control unit 1501 controls main processing. The capture unit 1503 captures a packet transmitted on a network via a switch or network tap which is compatible with port mirroring and is provided between the network monitoring apparatus 103 and the network.

The first request determiner 1511 determines whether or not a packet corresponds to a log acquisition request. The first request determiner 1511 includes a first logging unit 1513. However, the first logging unit 1513 may not be included in the first request determiner 1511. The first logging unit 1513 extracts attribute data from a packet related to the log acquisition request, and generates a new record in an operation log.

The first success/failure determiner 1515 determines whether processing related to a log acquisition service has succeeded or failed. The first success/failure determiner 1515 includes a first specifier 1517, a first extractor 1519, a first calculator 1521, and a first recording processing unit 1523. However, the first specifier 1517, the first extractor 1519, the first calculator 1521, and the first recording processing unit 1523 may not be included in the first success/failure determiner 1515. The first specifier 1517 specifies a head packet in a log acquisition response. The first extractor 1519 extracts a total size of the log acquisition response from the head packet. The first calculator 1521 calculates an area size assigned for the log acquisition response in the head packet. The first recording processing unit 1523 records a determination result regarding log acquisition processing in a record of an operation log.

The second request determiner 1531 determines whether or not a packet corresponds to a task registration request. The second request determiner 1531 includes a second logging unit 1533. However, the second logging unit 1533 may not be included in the second request determiner 1531. The second logging unit 1533 extracts attribute data from the packet related to the task registration request, and generates a new record in an operation log.

The second success/failure determiner 1535 determines whether processing related to a task registration service has succeeded or failed. The second success/failure determiner 1535 includes a second specifier 1537, a second extractor 1539, a second calculator 1541, and a second recording processing unit 1543. However, the second specifier 1537, the second extractor 1539, the second calculator 1541, and the second recording processing unit 1543 may not be included in the second success/failure determiner 1535. The second specifier 1537 specifies a head packet in a task registration response. The second extractor 1539 extracts a total size and a status of the task registration response from the head packet. The second calculator 1541 calculates an area size assigned for the task registration response in the head packet. The second recording processing unit 1543 records a determination result regarding task registration processing in a record of an operation log.

The third request determiner 1551 determines whether or not a packet corresponds to an account registration request. The third request determiner 1551 includes a third logging unit 1553. However, the third logging unit 1553 may not be included in the third request determiner 1551. The third logging unit 1553 extracts attribute data from the packet related to the account registration request, and generates a new record in an operation log.

The third success/failure determiner 1555 determines whether processing related to an account registration service has succeeded or failed. The third success/failure determiner 1555 includes a third specifier 1557, a third extractor 1559, and a third recording processing unit 1563. However, the third specifier 1557, the third extractor 1559, and the third recording processing unit 1563 may not be included in the third success/failure determiner 1555. The third specifier 1557 specifies a head packet in an account registration response. The third extractor 1559 extracts a status of the account registration response from the head packet. The third recording processing unit 1563 records a determination result regarding account registration processing in a record of an operation log.

The packet storage unit 1571 stores a captured packet. The operation log storage unit 1573 stores an operation log.

The control unit 1501, the capture unit 1503, the first request determiner 1511, the first logging unit 1513, the first success/failure determiner 1515, the first specifier 1517, the first extractor 1519, the first calculator 1521, the first recording processing unit 1523, the second request determiner 1531, the second logging unit 1533, the second success/failure determiner 1535, the second specifier 1537, the second extractor 1539, the second calculator 1541, the second recording processing unit 1543, the third request determiner 1551, the third logging unit 1553, the third success/failure determiner 1555, the third specifier 1557, the third extractor 1559, and the third recording processing unit 1563, which are described above, are implemented using hardware resources (for example, FIG. 21) and a program that causes a processor to execute processing described below.

Figure 21:
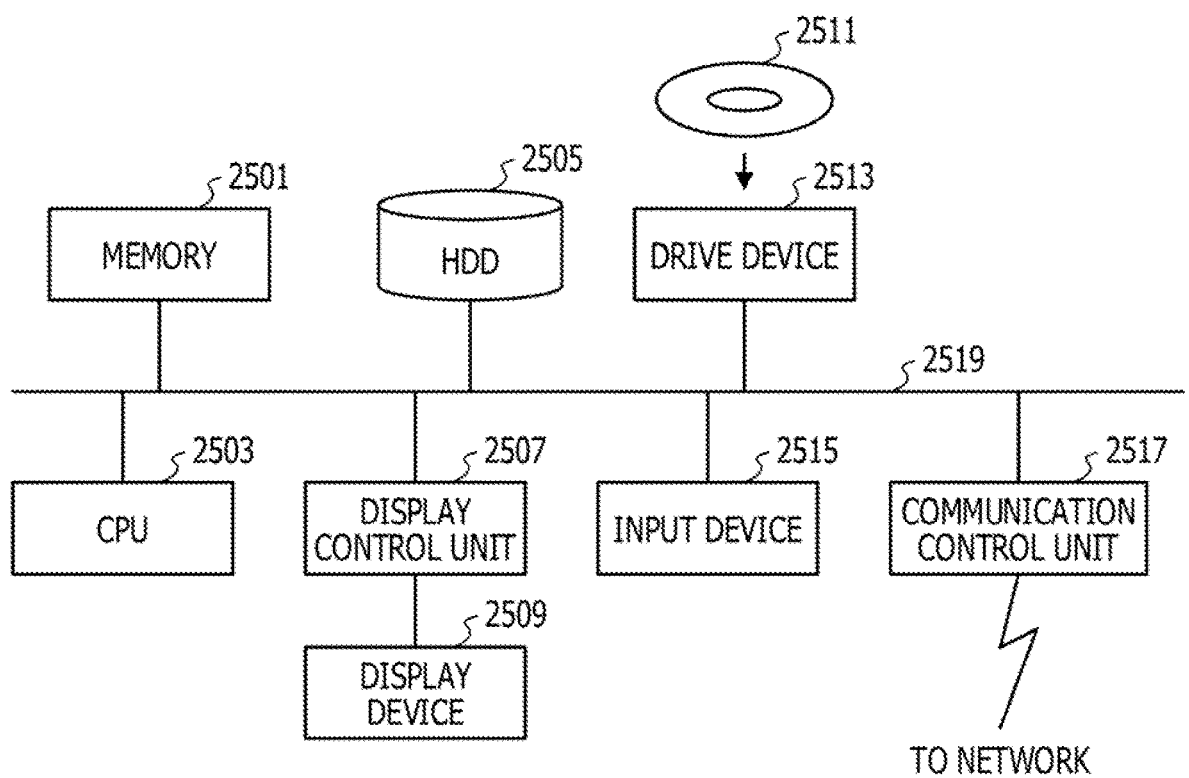
FIG. 21 is a functional block diagram of a computer.

The packet storage unit 1571 and the operation log storage unit 1573 described above are implemented using hardware resources (for example, FIG. 21).

Figure 16A:
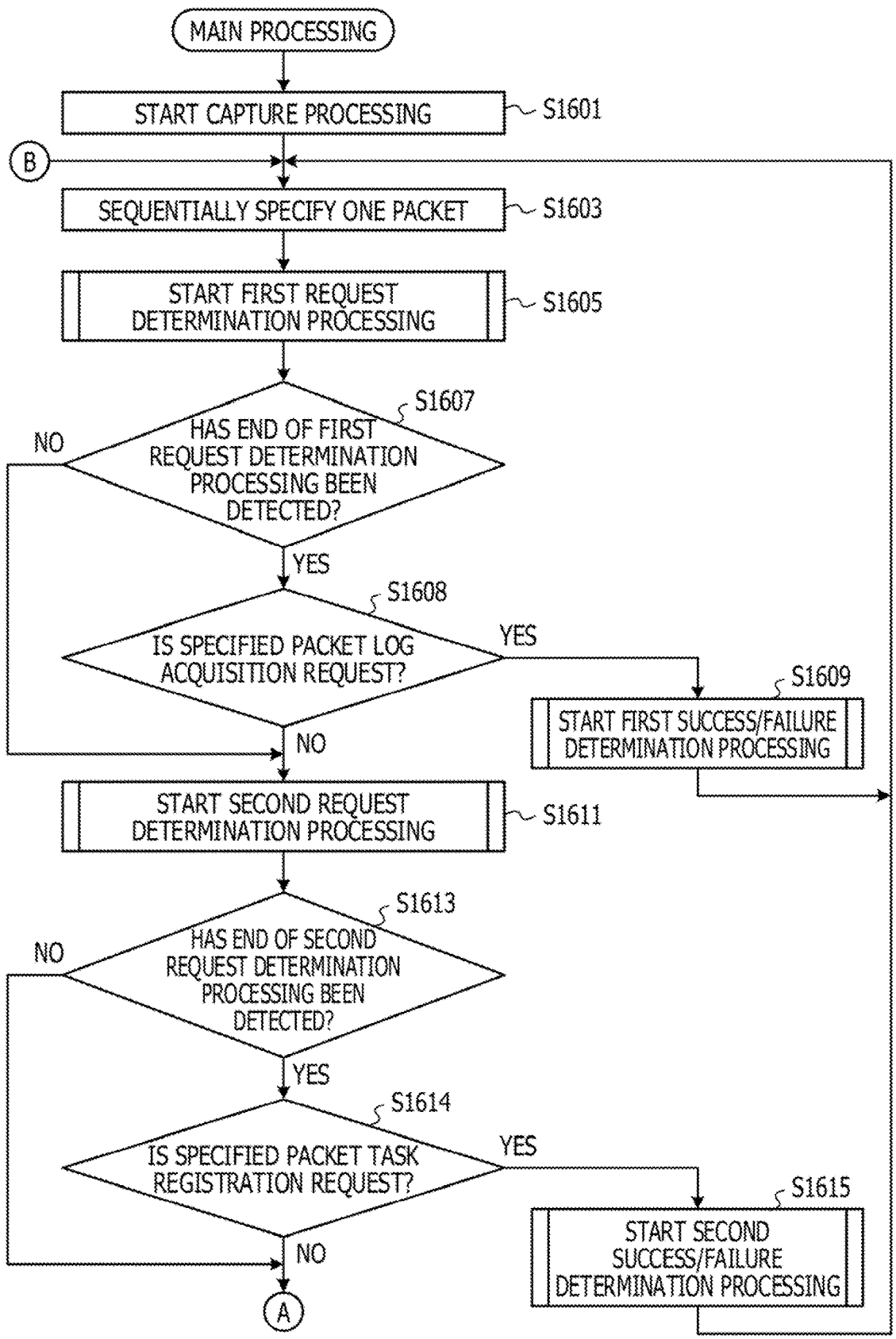
FIG. 16A illustrates a main processing flow.
Figure 16B:
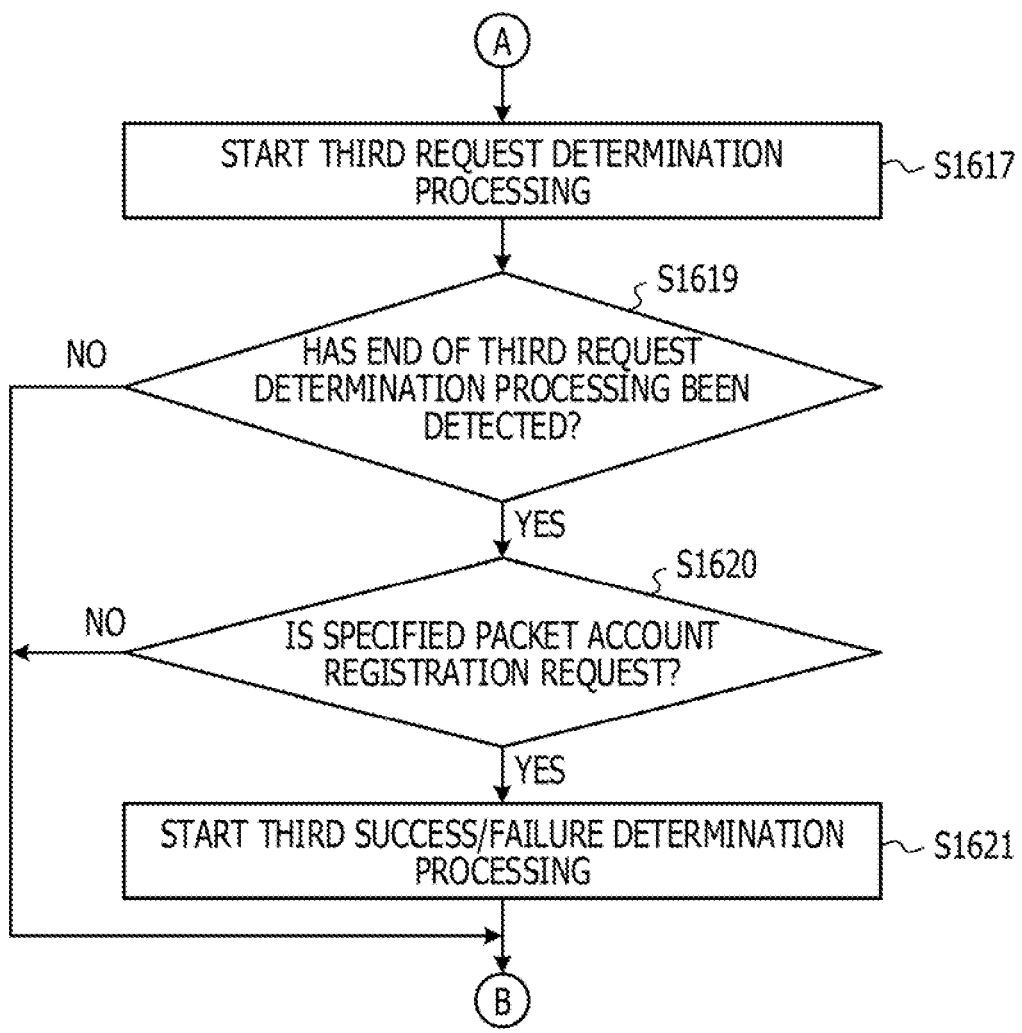
FIG. 16B illustrates the main processing flow.

Processing in the network monitoring apparatus 103 will now be described. FIGS. 16A and 16B illustrate a main processing flow. The control unit 1501 starts capture processing (S1601). In the capture processing, the capture unit 1503 captures a packet transmitted on a network via a switch or network tap which is compatible with port mirroring and is provided between the network monitoring apparatus 103 and the network. The captured packet is stored in the packet storage unit 1571. The capture unit 1503 may attach captured date and time to the stored packet.

The control unit 1501 sequentially specifies one captured packet (S1603). The control unit 1501 starts first request determination processing related to the packet specified in S1603 (S1605). In the first request determination processing, it is determined whether or not the packet corresponds to a log acquisition request. In this example, the first request determination processing operates in parallel with the main processing as a separate thread. Therefore, the processing proceeds to S1607 without waiting for an end of the started first request determination processing. The first request determination processing will be described later with reference to FIG. 17.

The control unit 1501 determines whether or not the end of the first request determination processing has been detected (S1607). In a case where the end of the first request determination processing has not been detected, the processing proceeds to S1611. On the other hand, in a case where the end of the first request determination processing has been detected, the control unit 1501 branches the processing depending on whether or not it is determined in the first request determination processing that the packet specified in S1603 corresponds to a log acquisition request (S1608).

In a case where the packet specified in S1603 does not correspond to a log acquisition request, the processing proceeds to S1611. On the other hand, in a case where the packet corresponds to a log acquisition request, the control unit 1501 starts first success/failure determination processing (S1609). In the first success/failure determination processing, success or failure of processing related to the log acquisition is determined. In this example, the first success/failure determination processing operates in parallel with the main processing as a separate thread. The first success/failure determination processing will be described later with reference to FIG. 18. When the first success/failure determination processing is started, the processing returns to S1603 and the above-described processing is repeated.

Now, S1611 will be described. The control unit 1501 starts second request determination processing related to the packet specified in S1603 (S1611). In the second request determination processing, it is determined whether or not the packet corresponds to a task registration request. In this example, the second request determination processing operates in parallel with the main processing as a separate thread.

Therefore, the processing proceeds to S1613 without waiting for an end of the started second request determination processing. The second request determination processing will be described later with reference to FIG. 19.

The control unit 1501 determines whether or not the end of the second request determination processing has been detected (S1613). In a case where the end of the second request determination processing has not been detected, the processing proceeds to S1617 illustrated in FIG. 16B via a terminal A. On the other hand, in a case where the end of the second request determination processing has been detected, the control unit 1501 branches the processing depending on whether or not it is determined in the second request determination processing that the packet specified in S1603 corresponds to a task registration request (S1614).

In a case where the packet specified in S1603 does not correspond to a task registration request, the processing proceeds to S1617 illustrated in FIG. 16B via the terminal A. On the other hand, in a case where the packet corresponds to a task registration request, the control unit 1501 starts second success/failure determination processing (S1615). In the second success/failure determination processing, success or failure of processing related to the task registration is determined. In this example, the second success/failure determination processing operates in parallel with the main processing as a separate thread. The second success/failure determination processing will be described later with reference to FIGS. 20A and 20B. When the second success/failure determination processing is started, the processing returns to S1603 and the above-described processing is repeated.

Now, FIG. 16B will be described. The control unit 1501 starts third request determination processing related to the packet specified in S1603 (S1617). In the third request determination processing, it is determined whether or not the packet corresponds to an account registration request. In this example, the third request determination processing operates in parallel with the main processing as a separate thread. Therefore, the processing proceeds to S1619 without waiting for an end of the started third request determination processing. In the third request determination processing, the above-described first type of processing is performed. Details of the third request determination processing will be omitted.

The control unit 1501 determines whether or not the end of the third request determination processing has been detected (S1619). In a case where the end of the third request determination processing has not been detected, the processing returns to S1603 via a terminal B and the above-described processing is repeated. On the other hand, in a case where the end of the third request determination processing has been detected, the control unit 1501 branches the processing depending on whether or not it is determined in the third request determination processing that the packet specified in S1603 corresponds to an account registration request (S1620).

In a case where the packet specified in S1603 does not correspond to an account registration request, the processing returns to S1603 via the terminal B and the above-described processing is repeated. On the other hand, in a case where the packet corresponds to an account registration request, the control unit 1501 starts third success/failure determination processing (S1621). In the third success/failure determination processing, success or failure of processing related to the account registration is determined. In this example, the third success/failure determination processing operates in parallel with the main processing as a separate thread. In the third success/failure determination processing, the above-described first type of processing is performed. Details of the third success/failure determination processing will be omitted. When the third success/failure determination processing is started, the processing returns to S1603 via the terminal B and the above-described processing is repeated.

Figure 17:
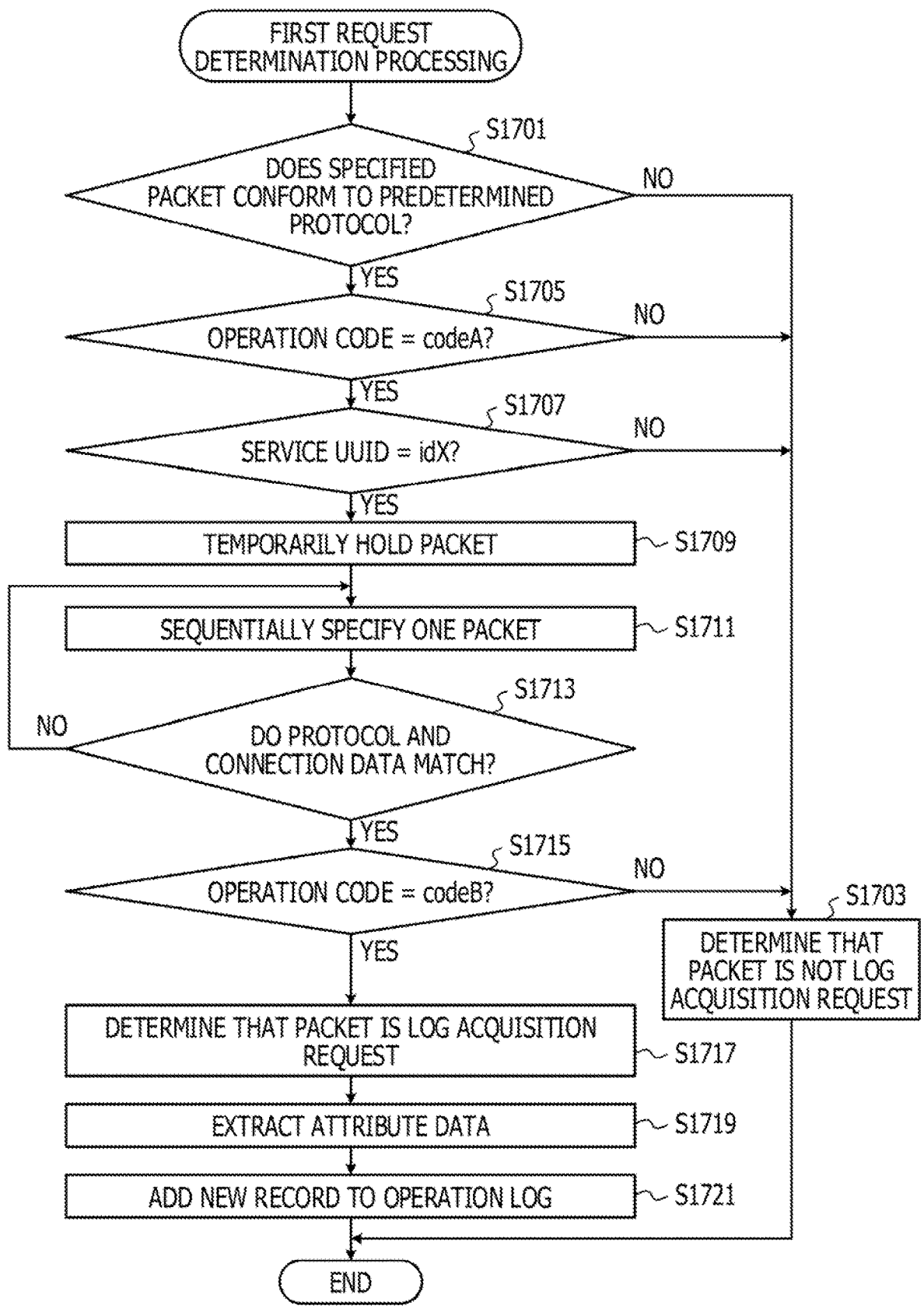
FIG. 17 illustrates a first request determination processing flow.

FIG. 17 illustrates a first request determination processing flow. The first request determiner 1511 determines whether or not the packet specified in S1603 conforms to a predetermined protocol related to remote control (S1701). In a case where it is determined that the packet does not conform to the predetermined protocol related to remote control, the first request determiner 1511 determines that the packet is not a log acquisition request (S1703). Then, the first request determination processing ends.

On the other hand, in a case where it is determined that the packet conforms to the predetermined protocol related to remote control, the first request determiner 1511 determines whether or not an operation code set in the packet is codeA (S1705). In a case where it is determined that the operation code set in the packet is not codeA, the first request determiner 1511 determines that the packet is not a log acquisition request (S1703). Then, the first request determination processing ends.

On the other hand, in a case where it is determined that the operation code set in the packet is codeA, the first request determiner 1511 determines whether or not a service UUID set in the packet is idX (S1707). In a case where it is determined that the service UUID set in the packet is not idX, the first request determiner 1511 determines that the packet is not a log acquisition request (S1703). Then, the first request determination processing ends.

On the other hand, in a case where it is determined that the service UUID set in the packet is idX, the first request determiner 1511 temporarily holds the packet (S1709). The first request determiner 1511 then sequentially specifies one packet following the packet (S1711).

The first request determiner 1511 determines whether or not a protocol and connection data in the packet temporarily held match those in the packet specified in S1711 (S1713). The connection data includes a source IP address, a source port number, a destination IP address, and a destination port number. In a case where it is determined that the protocols and/or the connection data in both packets do not match, the processing returns to S1711, and the above-described processing is repeated.

On the other hand, in a case where it is determined that the protocols and connection data in both packets match, the first request determiner 1511 determines whether or not an operation code set in the packet specified in S1711 is codeB (S1715). In a case where it is determined that the operation code set in the packet is not codeB, the first request determiner 1511 determines that the packet is not a log acquisition request (S1703). Then, the first request determination processing ends.

On the other hand, in a case where it is determined that the operation code set in the packet specified in S1711 is codeB, the first request determiner 1511 determines that the packet is a log acquisition request (S1717).

As described with reference to FIGS. 11 and 12, the first logging unit 1513 extracts attribute data (S1719) and adds a new record to an operation log (S1721). Then, the first request determination processing ends.

Figure 18:
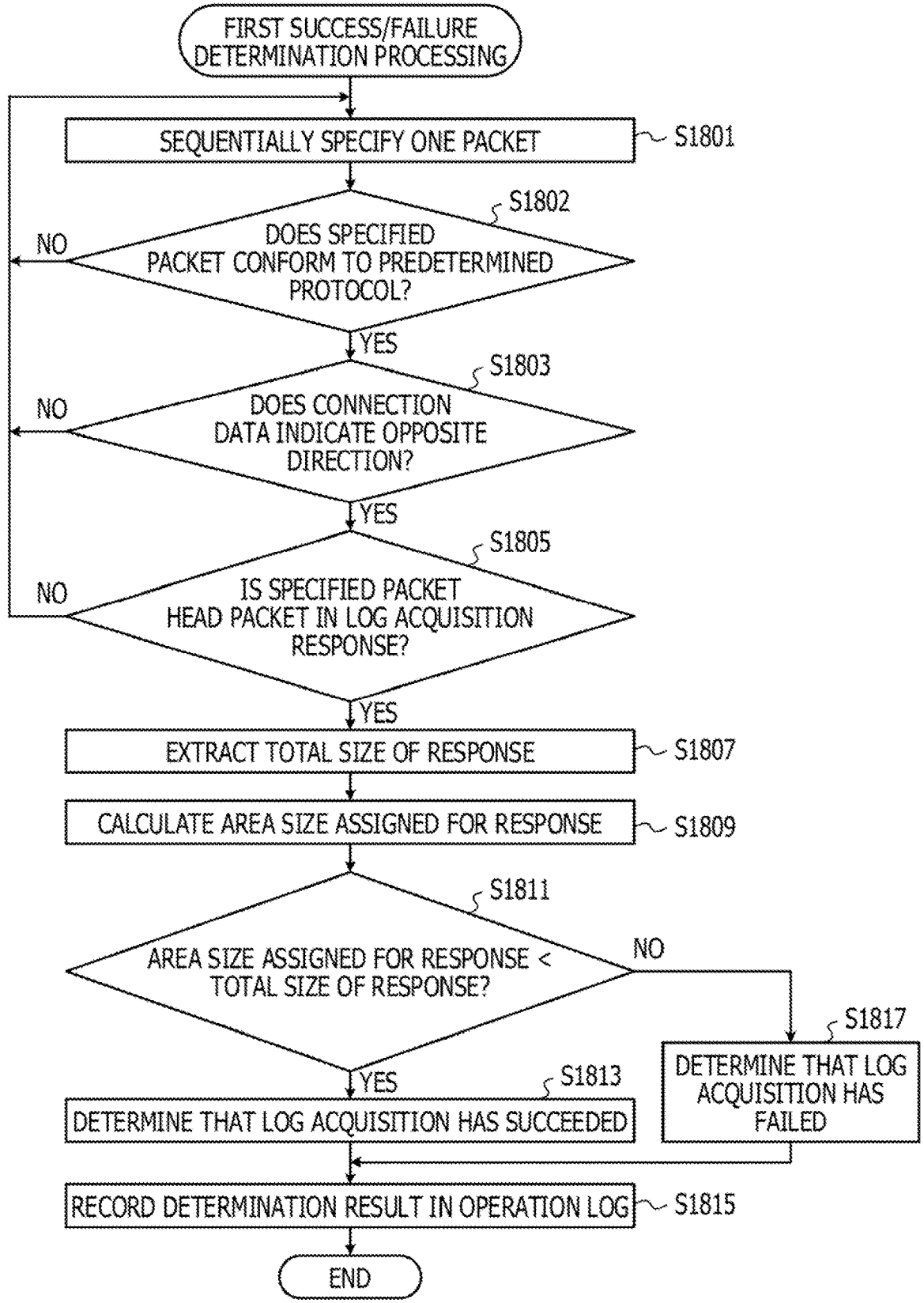
FIG. 18 illustrates a first success/failure determination processing flow.

FIG. 18 illustrates a first success/failure determination processing flow. The first specifier 1517 sequentially specifies one packet following the packet related to the log acquisition request (S1801).

The first specifier 1517 determines whether or not the packet specified in S1801 conforms to a predetermined protocol related to remote control (S1802). In a case where it is determined that the packet does not conform to the predetermined protocol related to remote control, the processing returns to S1801 and the above-described processing is repeated.

On the other hand, in a case where it is determined that the packet specified in S1801 conforms to the predetermined protocol related to remote control, the first specifier 1517 determines whether or not connection data in the packet indicates a direction opposite to a direction of the connection data in the packet related to the log acquisition request (S1803). Specifically, for example, it is determined that the opposite direction is indicated in a case where the following four conditions are satisfied. A first condition is that a source IP address of the packet specified in S1801 matches a destination IP address of the packet related to the log acquisition request. A second condition is that a source port number of the packet specified in S1801 matches a destination port number of the packet related to the log acquisition request. A third condition is that a destination IP address of the packet specified in S1801 matches a source IP address of the packet related to the log acquisition request. A fourth condition is that a destination port number of the packet specified in S1801 matches a source port number of the packet related to the log acquisition request.

In a case where it is determined that the connection data in the packet specified in S1801 does not indicate the direction opposite to the direction of the connection data in the packet related to the log acquisition request, the processing returns to S1801 and the above-described processing is repeated.

On the other hand, in a case where it is determined that the connection data in the packet specified in S1801 indicates the direction opposite to the direction of the connection data in the packet related to the log acquisition request, the first specifier 1517 determines whether or not the packet specified in S1801 corresponds to a head packet in a log acquisition response (S1805). For example, it is determined whether or not the packet is a head packet based on the order in a series of packets. In a case where it is determined that the packet does not correspond to a head packet in a log acquisition response, that is, in a case where second and subsequent packets are captured before a head packet is captured, for example, the processing returns to S1801 and the above-described processing is repeated. Alternatively, a packet first determined to indicate the opposite direction may be determined to be a head packet.

In a case where it is determined that the packet specified in S1801 corresponds to a head packet in a log acquisition response, the first extractor 1519 extracts a total size of the response from the packet, as described with reference to FIG. 10 (S1807). The first calculator 1521 calculates an area size assigned for the response, as described with reference to FIG. 10 (S1809).

The first success/failure determiner 1515 then determines whether or not the area size assigned for the response is smaller than the total size of the response (S1811). In a case where the area size is smaller than the total size of the response, the first success/failure determiner 1515 determines that log acquisition has succeeded (S1813). The first recording processing unit 1523 records the success in a field of a determination result in the record of the operation log provided in S1721 of FIG. 17 (S1815). Then, the first success/failure determination processing ends.

On the other hand, in a case where the area size is equal to or larger than the total size of the response, the first success/failure determiner 1515 determines that log acquisition has failed (S1817). Alternatively, the first success/failure determiner 1515 may determine that log acquisition has failed in a case where the area size matches the total size of the response. The first recording processing unit 1523 records the failure in the field of the determination result in the record of the operation log provided in S1721 of FIG. 17 (S1815). Then, the first success/failure determination processing ends.

Figure 19:
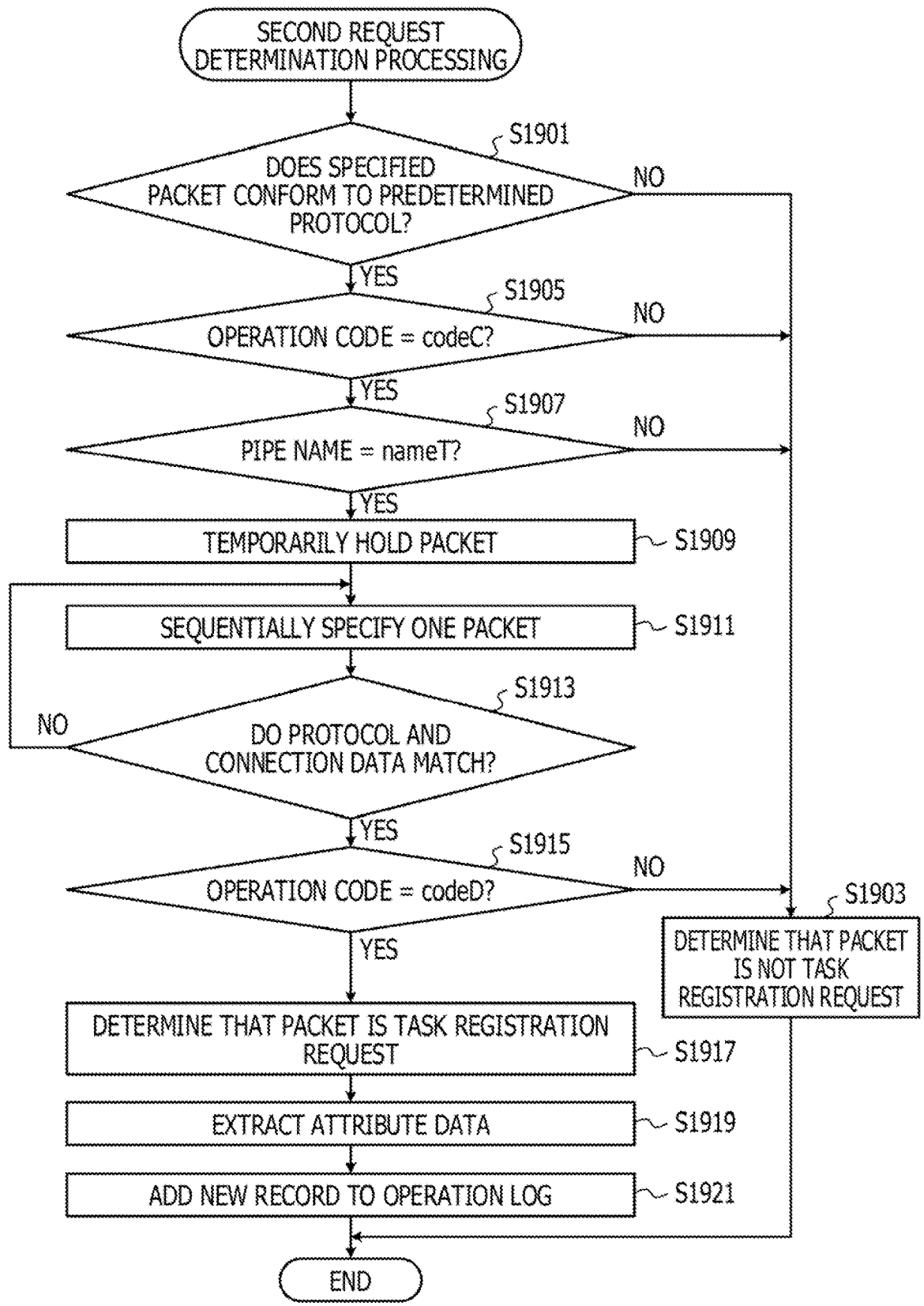
FIG. 19 illustrates a second request determination processing flow.

FIG. 19 illustrates a second request determination processing flow. The second request determiner 1531 determines whether or not the packet specified in S1603 conforms to a predetermined protocol related to remote control (S1901). In a case where it is determined that the packet does not conform to the predetermined protocol related to remote control, the second request determiner 1531 determines that the packet is not a task registration request (S1903). Then, the second request determination processing ends.

On the other hand, in a case where it is determined that the packet conforms to the predetermined protocol related to remote control, the second request determiner 1531 determines whether or not an operation code set in the packet is codeC (S1905). In a case where it is determined that the operation code set in the packet is not codeC, the second request determiner 1531 determines that the packet is not a task registration request (S1903). Then, the second request determination processing ends.

On the other hand, in a case where it is determined that the operation code set in the packet is codeC, the second request determiner 1531 determines whether or not a pipe name set in the packet is nameT (S1907). In a case where it is determined that the pipe name set in the packet is not nameT, the second request determiner 1531 determines that the packet is not a task registration request (S1903). Then, the second request determination processing ends.

On the other hand, in a case where it is determined that the pipe name set in the packet is nameT, the second request determiner 1531 temporarily holds the packet (S1909). The second request determiner 1531 then sequentially specifies one packet following the packet (S1911).

The second request determiner 1531 determines whether or not a protocol and connection data in the packet temporarily held match those in the packet specified in S1911 (S1913). In a case where it is determined that the protocols and/or the connection data in both packets do not match, the processing returns to S1911, and the above-described processing is repeated.

On the other hand, in a case where it is determined that the protocols and connection data in both packets match, the second request determiner 1531 determines whether or not an operation code set in the packet specified in S1911 is codeD (S1915). In a case where it is determined that the operation code set in the packet is not codeD, the second request determiner 1531 determines that the packet is not a task registration request (S1903). Then, the second request determination processing ends.

On the other hand, in a case where it is determined that the operation code set in the packet specified in S1911 is codeD, the second request determiner 1531 determines that the packet is a task registration request (S1917).

As described with reference to FIGS. 13 and 14, the second logging unit 1533 extracts attribute data (S1919) and adds a new record to an operation log (S1921). Then, the second request determination processing ends.

Figure 20B:
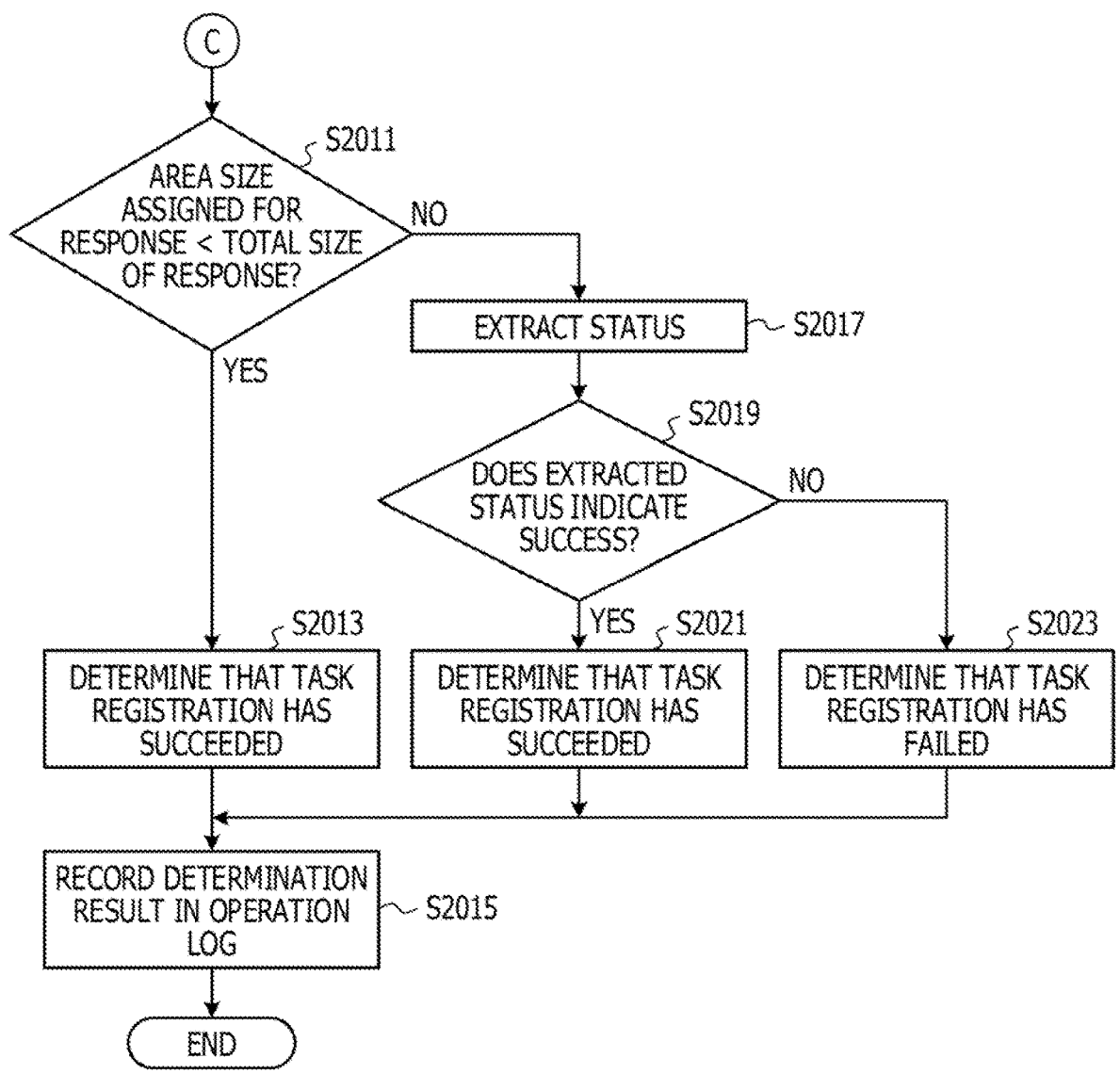
FIG. 20B illustrates the second success/failure determination processing flow.

FIGS. 20A and 20B illustrate a second success/failure determination processing flow. The second specifier 1537 sequentially specifies one packet following the packet related to the task registration request (S2001).

The second specifier 1537 determines whether or not the packet specified in S2001 conforms to a predetermined protocol related to remote control (S2002). In a case where it is determined that the packet does not conform to the predetermined protocol related to remote control, the processing returns to S2001 and the above-described processing is repeated.

On the other hand, in a case where it is determined that the packet specified in S2001 conforms to the predetermined protocol related to remote control, the second specifier 1537 determines whether or not connection data in the packet indicates a direction opposite to a direction of the connection data in the packet related to the task registration request (S2003). Specifically, for example, it is determined that the opposite direction is indicated in a case where the following four conditions are satisfied. A first condition is that a source IP address of the packet specified in S2001 matches a destination IP address of the packet related to the task registration request. A second condition is that a source port number of the packet specified in S2001 matches a destination port number of the packet related to the task registration request. A third condition is that a destination IP address of the packet specified in S2001 matches a source IP address of the packet related to the task registration request. A fourth condition is that a destination port number of the packet specified in S2001 matches a source port number of the packet related to the task registration request.

In a case where it is determined that the connection data in the packet specified in S2001 does not indicate the direction opposite to the direction of the connection data in the packet related to the task registration request, the processing returns to S2001 and the above-described processing is repeated.

On the other hand, in a case where it is determined that the connection data in the packet specified in S2001 indicates the direction opposite to the direction of the connection data in the packet related to the task registration request, the second specifier 1537 determines whether or not the packet specified in S2001 corresponds to a head packet in a task registration response (S2005). In a case where it is determined that the packet does not correspond to a head packet in a task registration response, that is, in a case where second and subsequent packets are captured before a head packet is captured, for example, the processing returns to S2001 and the above-described processing is repeated. Alternatively, as described above, a packet first determined to indicate the opposite direction may be determined to be a head packet.

In a case where it is determined that the packet specified in S2001 corresponds to a head packet in a task registration response, the second extractor 1539 extracts a total size of the response from the packet, as described with reference to FIG. 10 (S2007). The second calculator 1541 calculates an area size assigned for the response, as described with reference to FIG. 10 (S2009). The processing proceeds to S2011 of FIG. 20B via a terminal C.

The second success/failure determiner 1535 determines whether or not the area size assigned for the response is smaller than the total size of the response (S2011). In a case where the area size is smaller than the total size of the response, the second success/failure determiner 1535 determines that task registration has succeeded (S2013). The second recording processing unit 1543 records the success in a field of a determination result in the record of the operation log provided in S1921 of FIG. 19 (S2015). Then, the second success/failure determination processing ends.

On the other hand, in a case where the area size is equal to or larger than the total size of the response, the second extractor 1539 extracts a status from the packet (S2017). Alternatively, the second extractor 1539 may extract the status from the packet in a case where the area size matches the total size of the response. The second success/failure determiner 1535 determines whether or not the extracted status indicates success (S2019).

In a case where the status indicates success, the second success/failure determiner 1535 determines that the task registration has succeeded (S2021). The second recording processing unit 1543 records the success in a field of a determination result in the record of the operation log provided in S1921 of FIG. 19 (S2015).

On the other hand, in a case where the status does not indicate success, that is, for example, in a case where the status indicates failure, the second success/failure determiner 1535 determines that the task registration has failed (S2023). The second recording processing unit 1543 records the failure in the field of the determination result in the record of the operation log provided in S1921 of FIG. 19 (S2015). Then, the second success/failure determination processing ends.

According to the present embodiment, success of remote control in a network may be determined more quickly.

In addition, since it is determined that the remote control has succeeded in a case where the area size is less than the total size, the processing result may be determined more quickly in the type of the remote control in which the response at the time of success is divided into a plurality of packets.

Furthermore, since the status is extracted from the head packet in a case where the area size is equal to or larger than the total size and success or failure of the remote control is determined based on the status, the processing result may be determined more quickly in the type of the remote control in which the response at the time of success may not be divided into a plurality of packets.

Although one embodiment of the present invention has been described thus far, the present invention is not limited to the embodiment. For example, the above-described functional block configuration may not match a program module configuration.

In addition, the configuration of each storage area described above is an example and the configuration is not necessarily as described above. Furthermore, in the processing flow, the order of processing may be exchanged or a plurality of types of processing may be executed in parallel, as long as the processing result does not change.

The above-described network monitoring apparatus 103 is a computer apparatus and, as illustrated in FIG. 21, a memory 2501, a central processing unit (CPU) 2503, a hard disk drive (HOD) 2505, a display control unit 2507 connected to a display device 2509, a drive device 2513 for a removable disk 2511, an input device 2515, and a communication control unit 2517 for connecting to a network are connected by a bus 2519. An operating system (OS) and an application program for carrying out the processing in the present example are stored in the HDD 2505 and read from the HDD 2505 to the memory 2501 when executed by the CPU 2503. The CPU 2503 controls the display control unit 2507, the communication control unit 2517, and the drive device 2513 according to the processing content of the application program and causes these members to perform a predetermined operation. Data in the middle of processing is mainly stored in the memory 2501, but may be stored in the HDD 2505. In the example of the present invention, the application program for carrying out the above-described processing is stored in the computer readable removable disk 2511 to be distributed and installed in the HDD 2505 from the drive device 2513. Alternatively, the application program may be installed in the HDD 2505 by way of a network such as the Internet and the communication control unit 2517. Such a computer apparatus implements various functions as described above by organic cooperation between hardware such as the CPU 2503 and the memory 2501 and programs such as the OS and the application program described above.

The embodiment of the present invention described thus far is summarized as follows.

The network monitoring apparatus according to the present embodiment includes: (A) a specifier that specifies a head packet for transmitting a response related to remote control among packets captured in a network; (B) an extractor that extracts a total size of the response from the head packet; (C) a calculator that calculates an area size assigned for the response in the head packet; and (D) a determiner that determines, based on the total size and the area size, that the remote control has succeeded.

In this way, success of the remote control in the network may be determined more quickly. Note that the first specifier 1517 and the second specifier 1537 in FIG. 15A are examples of the specifier. The first extractor 1519 and the second extractor 1539 in FIG. 15A are examples of the extractor. The first calculator 1521 and the second calculator 1541 in FIG. 15A are examples of the calculator. The first success/failure determiner 1515 and the second success/failure determiner 1535 in FIG. 15A are examples of the determiner.

Furthermore, the determiner may determine that the remote control has succeeded in a case where the area size is less than the total size.

In this way, a processing result may be determined more quickly in a type of the remote control in which the response at the time of success is divided into a plurality of packets.

Furthermore, the determiner may extract a status from the head packet in a case where the area size is equal to or larger than the total size, and determine success or failure of the remote control based on the status.

In this way, a processing result may be determined more quickly in a type of the remote control in which the response at the time of success may not be divided into a plurality of packets.

A program for causing a computer to execute the above-described processing in the network monitoring apparatus may be created, and the program may be stored in, for example, a computer readable storage medium or storage device, such as a flexible disk, a compact disk read only memory (CD-ROM), a magneto-optical disk, a semiconductor memory, or a hard disk. An intermediate processing result is normally temporarily saved in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
specify, from among packets which are captured in a network, a head packet for transmitting a response related to remote control;
extract a total size of the response from the head packet;
calculate an area size which is assigned for the response in the head packet;
compare the total size and the area size; and
determine, based on a comparison result, that the remote control succeeds.

2. The information processing apparatus according to claim 1, wherein the processor is configured to determine that the remote control succeeds in a case where the area size is less than the total size.

3. The information processing apparatus according to claim 1, wherein the processor is configured to, in a case where the area size is equal to or larger than the total size, extract a status from the head packet, and determine success or failure of the remote control based on the status.

4. A non-transitory computer-readable recording medium recording a network monitoring program for causing a computer to execute processing, the processing comprising:
specifying, from among packets which are captured in a network, a head packet for transmitting a response related to remote control;
extracting a total size of the response from the head packet;
calculating an area size which is assigned for the response in the head packet;
comparing the total size and the area size; and
determining, based on a comparison result, that the remote control succeeds.

5. The non-transitory computer-readable recording medium according to claim 4, wherein it is determined that the remote control succeeds in a case where the area size is less than the total size.

6. The non-transitory computer-readable recording medium according to claim 4, further comprising: extracting a status from the head packet in a case where the area size is equal to or larger than the total size; and determining success or failure of the remote control based on the status.

7. A method for monitoring a network comprising:
specifying, by a computer, from among packets which are captured in a network, a head packet for transmitting a response related to remote control;
extracting a total size of the response from the head packet;
calculating an area size which is assigned for the response in the head packet;
comparing the total size and the area size; and
determining, based on a comparison result, that the remote control succeeds.

8. The method according to claim 7, wherein it is determined that the remote control succeeds in a case where the area size is less than the total size.

9. The method according to claim 7, further comprising: extracting a status from the head packet in a case where the area size is equal to or larger than the total size; and determining success or failure of the remote control based on the status.

* * * * *